(12) United States Patent
Kwon

(10) Patent No.: US 12,374,245 B2
(45) Date of Patent: Jul. 29, 2025

(54) ELECTRONIC APPARATUS AND CONTROL METHOD THEREOF

(71) Applicant: SAMSUNG ELECTRONICS CO., LTD., Suwon-si (KR)

(72) Inventor: Ohyun Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/444,038

(22) Filed: Feb. 16, 2024

(65) Prior Publication Data
US 2024/0185749 A1 Jun. 6, 2024

Related U.S. Application Data

(63) Continuation of application No. PCT/KR2022/011741, filed on Aug. 8, 2022.

(30) Foreign Application Priority Data

Aug. 17, 2021 (KR) ................. 10-2021-0108137

(51) Int. Cl.
*G09G 3/00* (2006.01)
*G03B 21/14* (2006.01)

(52) U.S. Cl.
CPC ........... *G09G 3/002* (2013.01); *G03B 21/147* (2013.01); *G09G 2320/062* (2013.01);
(Continued)

(58) Field of Classification Search
CPC .... G06Q 30/0269; G06Q 30/06; G06Q 30/02; G06F 3/011; G06F 3/0482; G06V 20/50; G60V 40/10
See application file for complete search history.

(56) References Cited

U.S. PATENT DOCUMENTS 7,300,160 B2 11/2007 Nakamura
7,683,857 B2 3/2010 Yoshida
(Continued)

FOREIGN PATENT DOCUMENTS

CN 105959659 A1 9/2016
JP 2010-217756 9/2010
(Continued)

OTHER PUBLICATIONS

International Search Report dated Nov. 28, 2022 issued in PCT Application No. PCT/KR2022/011741.
(Continued)

*Primary Examiner* — Christopher E Leiby
(74) *Attorney, Agent, or Firm* — STAAS & HALSEY LLP

(57) ABSTRACT

An electronic apparatus comprises a projecting part to project an image, an illuminance sensor, a lighting part comprising a light source, a memory to store at least one instruction; and a processor configured to control the electronic apparatus by executing the at least one instruction stored in the memory. The processor is configured to control the illuminance sensor to obtain information on first illuminance corresponding to an external lighting device, control the illuminance sensor to obtain information on second illuminance corresponding to the image projected by the projecting part, and control the light source of the lighting part based on the information on the first illuminance and the information on the second illuminance.

15 Claims, 18 Drawing Sheets

(52) U.S. Cl.
CPC ............... *G09G 2320/0626* (2013.01); *G09G 2320/066* (2013.01); *G09G 2354/00* (2013.01); *G09G 2360/144* (2013.01); *G09G 2360/145* (2013.01)

(56) References Cited

U.S. PATENT DOCUMENTS

| | | | |
|---|---|---|---|
| 10,511,823 | B2 | 12/2019 | Nakajima et al. |
| 10,893,245 | B1* | 1/2021 | Choi .................... H04N 9/3194 |
| 2005/0094110 | A1* | 5/2005 | Nakamura ......... H04N 21/4318 |
| | | | 348/E5.12 |
| 2015/0102998 | A1 | 4/2015 | Oami |
| 2017/0078629 | A1* | 3/2017 | Kozak .................. H04N 9/3161 |
| 2020/0081329 | A1* | 3/2020 | Cheng .................. H04N 9/3182 |
| 2021/0058593 | A1* | 2/2021 | Lin .......................... G09G 5/02 |

FOREIGN PATENT DOCUMENTS

| | | |
|---|---|---|
| JP | 2016-57343 | 4/2016 |
| JP | 6429165 | 11/2018 |
| JP | 6644371 | 2/2020 |
| JP | 6706331 | 6/2020 |
| JP | 7296580 | 6/2023 |
| KR | 2005-106951 | 4/2005 |
| KR | 10-0591386 | 6/2006 |
| KR | 10-2012-0029246 | 3/2012 |
| KR | 10-2020-0012408 | 2/2020 |
| KR | 10-2020-0145642 | 12/2020 |
| KR | 10-2246954 | 4/2021 |

OTHER PUBLICATIONS

Written Opinion Report dated Nov. 28, 2022 issued in PCT Application No. PCT/KR2022/011741.

* cited by examiner

ELECTRONIC APPARATUS AND CONTROL METHOD THEREOF

CROSS REFERENCE TO THE RELATED APPLICATION

This application is a continuation application, filed under 35 U.S.C. § 111(a), of International Application PCT/KR2022/011741 filed Aug. 8, 2022, and is based on and claims priority under 35 U.S.C. § 119 to Korean Patent Applications No. 10-2021-0108137, filed on Aug. 17, 2021 in the Korean Intellectual Property Office, the disclosures of which are incorporated by reference herein in their entireties.

TECHNICAL FIELD

The disclosure provides an electronic apparatus that projects an image and a control method thereof and, more particularly to, an electronic apparatus that provides lighting based on information on illuminance in the indoor space and a control method thereof.

BACKGROUND ART

According to development of technology, an electronic apparatus, for example, a display device, a lighting device, a portable communication device, and a projector having various optical output functions, has been developed. Among them, a projector is an electronic apparatus from which light that is output from a light source is enlarged and projected onto a wall or a screen through a projection lens.

A related-art projector prevents glare of a user by lowering a signal gain of contents simply using brightness information of contents, but there is a problem of degrading a contrast ratio of a projected image.

DISCLOSURE

Technical Problem

The disclosure has been made to address the aforementioned problem. The purpose of the disclosure is to provide an electronic apparatus for controlling illuminance in the indoor space through a lighting part that makes a light source emit light, and a control method therefor.

Technical Solution

An electronic apparatus includes a projecting part to project an image; an illuminance sensor; a lighting part comprising a light source; a memory that stores at least one instruction; and a processor configured to control the electronic apparatus by executing the at least one instruction stored in the memory, and the processor may control the illuminance sensor to obtain information on first illuminance corresponding to an external lighting device control the illuminance sensor, to obtain information on second illuminance corresponding to an image projected by the projecting part, and control the light source of the lighting part based on the information on the first illuminance and the information on the second illuminance.

The electronic apparatus may further include a distance sensor, and the processor may control the distance sensor to obtain information on a first location for a projection region corresponding to the image projected by the projection part, control the distance sensor to obtain information on a second location for a user, and control a light source of the lighting part based on information on a distance between the projection region and the user obtained based on the information on the first location and the information on the second location, the information on the first illuminance, and the information on the second illuminance.

The processor may control the illuminance sensor to obtain information on third illuminance corresponding to the light source of the lighting part while the light source of the lighting part emits light, and control the light source of the lighting part based on the information on the first illuminance, the information on the second illuminance, and the information on the third illuminance.

The processor may control the light source of the lighting part such that a sum of a value of the first illuminance and a value of the third illuminance is greater than or equal to a predetermined ratio of a value of the second illuminance.

The processor may, based on the first illuminance being less than a first threshold value and the second illuminance being greater than or equal to a second threshold value, control the lighting part to decrease brightness of an image projected by the projecting part and increase brightness of the light source of the lighting part.

The processor may, based on the information on the first illuminance being less than a first threshold value and the information on the second illuminance being less than a third threshold value, control the lighting part to decrease brightness of a light source of the lighting part.

The processor may obtain information on an image projected by the projection part, and control the light source of the lighting part or correct the image projected by the projection part by further using the information on the image.

The processor may, based on identifying that the image is an average picture level (HDR) image based on the information on the image, control the lighting part to increase brightness of the light source of the lighting part.

The processor may, based on identifying, based on the information on the image, that brightness of a background screen of the image is less than preset brightness and an object included in the image moves, control the lighting part to increase brightness of the light source of the lighting part.

The electronic apparatus may further include an input/output interface configured to communicate with an external device, and the processor may, based on the information on the first illuminance and the information on the second illuminance, control the input/output interface to transmit brightness of an external lighting device communicable with the electronic apparatus to the external lighting device.

A control method of an electronic apparatus according to an embodiment of the disclosure includes obtaining, by an illuminance sensor, information on first illuminance corresponding to an external lighting device; obtaining, by the illuminance sensor, information on second illuminance corresponding to an image projected by the electronic apparatus: and controlling, by a processor, a light source of a lighting part in the electronic apparatus based on the information on the first illuminance and the information on the second illuminance.

The method according to the disclosure may further include obtaining, by a distance sensor, information on a first location for a projection region corresponding to an image projected by the electronic apparatus; obtaining information, by the distance sensor, on a second location for a user; and controlling, by the processor, the light source of the lighting part based on information on distance between the projection region and the user obtained through the information on the first location and the information on the second location, the information on the first illuminance, and the information on the second illuminance.

The method according to the disclosure may further include obtaining, by the illuminance sensor, information on third illuminance corresponding to the light source of the lighting part while the light source of the lighting part emits light; and controlling, by the processor, the light source of the lighting part based on the information on the first illuminance, the information on the second illuminance, and the information on third the illuminance.

The controlling the light source of the lighting part may include controlling the light source of the lighting part so that a sum of a value of the information on the first illuminance and a value of the information on the third illuminance is greater than or equal to a predetermined ratio of a value of the second illuminance.

The controlling the light source of the lighting part in the electronic apparatus may include, based on the first illuminance being less than a first threshold value and the second illuminance being greater than or equal to a second threshold value, controlling the lighting part to decrease brightness of the image projected by the electronic apparatus and increase brightness of the light source of the lighting part.

The controlling the light source of the lighting part in the electronic apparatus may further include, based on the first illuminance being less than a first threshold value and the second illuminance being less than a third threshold value, controlling the lighting part to decrease brightness of the light source of the lighting part.

The method according to the disclosure may further include obtaining information on an image projected by the projection part; and controlling the light source of the lighting part or correct the image projected by the projection portion by further using the information on the image.

The method according to the disclosure may further include, based on identifying that the image is an average picture level (HDR) image through the information on the image, controlling the lighting part to increase brightness of the light source of the lighting part.

The method according to the disclosure may further include, based on identifying, through the information on the image, that brightness of a background screen of the image is less than preset brightness and an object included in the image moves, controlling the lighting part to increase brightness of the light source of the lighting part.

The electronic apparatus may further include an input/output interface configured to communicate with an external device, and the controlling the light source of the lighting part in the electronic apparatus may include, based on the information on the first illuminance and the information on the second illuminance, controlling the input/output interface to transmit brightness of an external lighting device communicable with the electronic apparatus to the external lighting device.

Effect of Invention

By the various embodiments described above, an electronic apparatus may prevent glare of a user without degradation of quality of a projected image.

MODE FOR INVENTION

Figure 1:
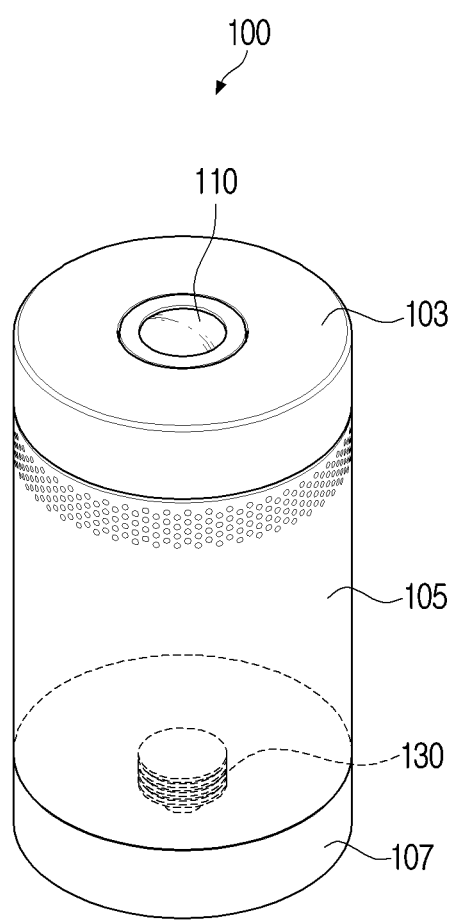
FIG. 1 is a perspective view illustrating an exterior of an electronic apparatus according to embodiments of the disclosure.

FIG. 1 is a perspective view illustrating an exterior of an electronic apparatus 100 according to an embodiment of the disclosure.

Referring to FIG. 1, the electronic apparatus 100 may include a head 103, a main body 105, a projection lens 110, a connector 130 or a cover 107.

The electronic apparatus 100 may be devices in various forms. In particular, the electronic apparatus 100 may be a projector device that enlarges and projects an image to a wall or a screen, and the projector device may be a liquid crystal display (LCD) projector or a digital light processing (DLP) type projector that uses a digital micromirror device (DMD).

In addition, the electronic apparatus 100 may be a home or industrial display device, an illumination device used in daily life, or an audio device including an audio module. The electronic apparatus 100 may be implemented as a portable communication device (e.g., smartphone), a computer device, a portable multimedia device, a wearable device, a home appliance device, or the like. The electronic apparatus 100 according to an embodiment of the disclosure is not limited to the above-described device and may be implemented as an electronic apparatus 100 having two or more functions of the above-described devices. For example, the electronic apparatus 100 may be used as the display device, the illumination device or the audio device while its projector function is turned off and its illumination function or a speaker function is turned on based on a manipulation of the processor or may be used as an artificial intelligence (AI) speaker including a microphone or a communication device.

The main body 105 is a housing constituting the exterior and may support or protect components of the electronic apparatus 100 (e.g., components illustrated in FIG. 2A and FIG. 2B) that are arranged inside the main body 105. A shape of the main body 105 may be close to a cylindrical shape as illustrated in FIG. 1. However, the shape of the main body 105 is not limited thereto, and according to various embodiments of the disclosure, the main body 105 may be implemented in various geometrical shapes such as a column having polygonal cross sections, a cone, or a sphere.

The main body 105 may have a size enabling the main body to be gripped or moved by a user with his/her one hand or may be implemented in a micro size enabling the main body to be easily carried by the user or a size enabling the main body to be held on a table or coupled to the illumination device.

A material of the main body 105 may be matt metallic or synthetic resin for the user's fingerprint or dust not to smear the main body. Alternatively, the exterior of the main body 105 may be made of a slick glossy material.

The main body 105 may have a friction area formed in a partial area of the exterior of the main body 105 for the user to grip and move the main body 105. Alternatively, the main body 105 may have a bent gripping part or a support 108a (refer to FIG. 4) positioned in at least a partial area for the user to grip the corresponding part.

The projection lens 110 may be formed on one surface of the main body 105, and project light passed through a lens array to outside the main body 105. The projection lens 110 according to the various embodiments of the disclosure may be an optical lens low-dispersion coated for reducing chromatic aberration. The projection lens 110 may be a convex lens or a condensing lens, and the projection lens 110 according to an embodiment of the disclosure may adjust a focus by adjusting positions of a plurality of sub lenses.

The head 103 may be coupled to one surface of the main body 105 to thus support and protect the projection lens 110. The head 103 may be coupled to the main body 105 to be swiveled within a predetermined angle range based on one surface of the main body 105.

The head 103 may be automatically or manually swiveled by the user or the processor to thus freely adjust a projection angle of the projection lens 110. Alternatively, not shown in the drawing, the head 103 may include a neck that is coupled to the main body 105 and extends from the main body 105, and the head 103 may thus adjust the projection angle of the projection lens 110 by being tilted backward or forward.

The electronic apparatus 100 may project light or the image to a desired position by adjusting a projection angle of the projection lens 110 while adjusting a direction of the head 103 in a state where the position and angle of the main body 105 are fixed. In addition, the head 103 may include a handle that the user may grip after rotating the head in a desired direction.

A plurality of openings may be formed in an outer peripheral surface of the main body 105. Through the plurality of openings, audio output from an audio outputter may be output to outside the main body 105 of the electronic apparatus 100. The audio outputter may include a speaker, and the speaker may be used for general uses such as reproduction of multimedia or reproduction of recording, and output of a voice.

According to an embodiment of the disclosure, the main body 105 may include a heat dissipation fan (not shown) provided therein, and in case that the heat dissipation fan (not shown) is operated, air or heat in the main body 105 may be discharged through the plurality of openings. Accordingly, the electronic apparatus 100 may discharge heat occurring due to the driving of the electronic apparatus 100 to the outside and prevent overheating of the electronic apparatus 100.

The connector 130 may connect the electronic apparatus 100 with an external device to transmit or receive electronic signals or receive power from the external device. The connector 130 according to an embodiment of the disclosure may be physically connected with the external device. The connector 130 may include an input/output interface to connect its communication with the external device in a wired or wireless manner or receive the power from the external device. For example, the connector 130 may include a high-definition multimedia interface (HDMI) connection terminal, a universal serial bus (USB) connection terminal, a secure digital (SD) card accommodating groove, an audio connection terminal, or a power consent. Alternatively, the connector 130 may include a Bluetooth, wireless-fidelity (Wi-Fi) or wireless charge connection module, connected with the external device in the wireless manner.

In addition, the connector 130 may have a socket structure connected to an external illumination device and may be connected to a socket accommodating groove of the external illumination device to receive the power. The size and specification of the connector 130 having the socket structure may be implemented in various ways in consideration of an accommodating structure of the external device that may be coupled thereto. For example, a diameter of a joining portion of the connector 130 may be 26 mm according to an international standard E26, and in this case, the electronic apparatus 100 may be coupled to the external illumination device such as a stand in place of a light bulb that is generally used. When being coupled to a conventional socket positioned on a ceiling, the electronic apparatus 100 may perform the projection top to bottom(vertically). Accordingly, by socket coupling, the electronic apparatus 100 cannot be rotated, and in this case, the screen cannot be rotated either. Accordingly, the electronic apparatus 100 may project or rotate the screen to the desired position while being socket-coupled to a stand on the ceiling by allowing the head 103 to swivel on one surface of the main body 105 to have an adjusted projection angle for the electronic apparatus 100 to be rotated even when being socket-coupled and receiving power.

The connector 130 may include a coupling sensor, and the coupling sensor may detect whether the connector 130 is coupled to the external device, its coupling state, or its coupling target, and transmit the same to the processor, and the processor may control the driving of the electronic apparatus 100 based on a received detection value.

The cover 107 may be coupled to or separated from the main body 105 and protect the connector 130 for the connector 130 not to be always exposed to the outside. The cover 107 may have a shape continued from the shape of the main body 105 as illustrated in FIG. 1 or a shape corresponding to the shape of the connector 130. The cover 107 may support the electronic apparatus 100, and the electronic apparatus 100 may be used by being coupled to or held on an external holder while being coupled to the cover 107.

In the electronic apparatus 100 according to the various embodiments of the disclosure, a battery may be positioned inside the cover 107. The battery may include, for example, a primary cell that cannot be recharged, a secondary cell that may be recharged, or a fuel cell.

Although now shown in the drawing, the electronic apparatus 100 may include a camera, and the camera may capture a still image or a video. According to an embodiment of the disclosure, the camera may include at least one lens, an image sensor, an image signal processor, or a flash.

Although now shown in the drawing, the electronic apparatus 100 may include a protection case (not shown) for the electronic apparatus 100 to be easily carried while being protected. Alternatively, the electronic apparatus 100 may include a stand (not shown) that supports or fixes the main body 105, or a bracket (not shown) that may be coupled to a wall surface or a partition.

In addition, the electronic apparatus 100 may be connected with the various external devices by using its socket structure, and provide various functions. For example, the electronic apparatus 100 may be connected to an external camera by using the socket structure. The electronic apparatus 100 may provide an image stored in the connected camera or an image that is currently being captured using a projecting part 111. For an example, the electronic apparatus 100 may be connected to a battery module by using the socket structure to receive power. The electronic apparatus 100 may be connected to the external device by using the socket structure, which is merely an example, and may be connected to the external device by using another interface (e.g., USB).

Figure 2A:
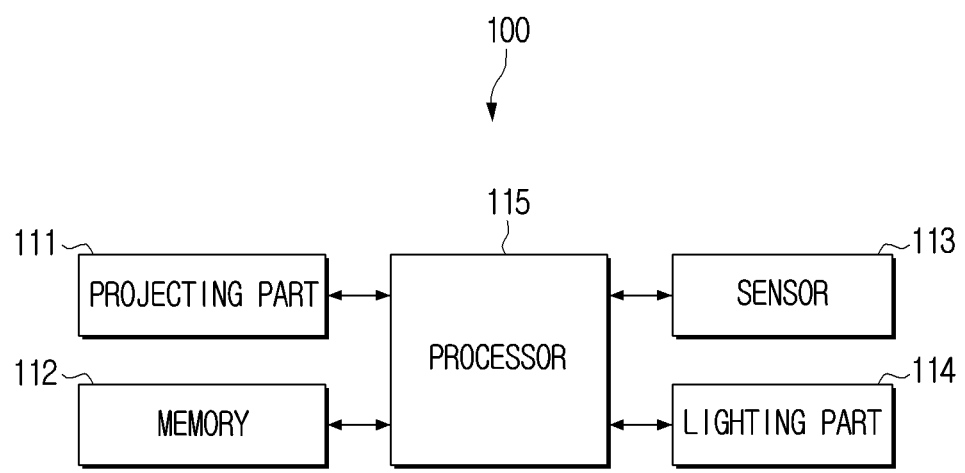
FIG. 2A is a block diagram illustrating an electronic apparatus according to an embodiment of the disclosure.

FIG. 2A is a block diagram illustrating a configuration of the electronic apparatus 100 according to an embodiment of the disclosure.

Referring to FIG. 2A, the electronic apparatus 100 may include a projecting part 111, a memory 112, a sensor 113 (or sensor part or sensor unit), a lighting part 114 and a processor 115.

The projecting part 111 may perform a function of outputting the image to the projection plane. A detailed description of the projecting part 111 is described with reference to FIG. 2b. Although described as projecting the image by using the projecting part, the electronic apparatus 100 may project the image in various ways. The projecting part 111 may include the projection lens 110. The projection plane may be a portion of a physical space where the image is output or may be a separate screen.

The memory 112 may store illuminance information and location information obtained through the sensor 113. A specific description related to the memory 112 will be described in FIG. 2B.

The sensor 113 may include at least one sensor.

As an embodiment, the sensor 113 may include an illuminance sensor, and may obtain information on ambient illuminance through the illuminance sensor. For example, the sensor 113 may obtain information on illuminance obtained through an illuminance sensor before a projection image is projected by the projecting part 111 as information on first illuminance corresponding to an external lighting device in the indoor space. In addition, the difference between the information on illuminance obtained through the illuminance sensor during projection of the image by the projecting part 111 and the information on first illuminance as the information on second illuminance corresponding to an image projected by the projecting part 111. In the meantime, the embodiment is not limited thereto and information on second illuminance may be obtained by various methods.

According to an embodiment, the sensor 113 may include a distance sensor, and may obtain location information on a location of a user around the electronic apparatus 100 and information on location of a projection region about an image projected by the projecting part 111 through the distance sensor. According to an embodiment, the distance sensor may include a time of flight (ToF) sensor. The ToF sensor may obtain information on space, information on distance, and information of movement of an object by calculating, through infrared wavelength, distance that light projected on an object is reflected and returned.

The distance sensor according to the disclosure may include a plurality of ToF sensors and may obtain information on location of an object around 360 degrees of the electronic apparatus 100. The embodiment is not limited thereto and the sensor 113 according to the disclosure may include one ToF sensor, and in this example, the one ToF sensor may obtain information on location of an object around the electronic apparatus 100 by rotating 360 degrees.

In the meantime, the distance sensor according to the disclosure may include at least one of an image sensor for capturing an image, a distance sensor, and a LiDAR sensor, in addition to the ToF sensor, and may obtain information on location of a projection region and information on location of a user through various sensors.

The lighting part 114 may emit a light source to control the illuminance in the indoor space. According to an embodiment, the lighting part 114 may include a plurality of light sources. The lighting part 114 may control at least one of a plurality of light sources based on information on first illuminance and information on second illuminance obtained through an illuminance sensor of the sensor 113. The plurality of light sources included in the lighting part 114 will be described later with reference to FIGS. 7A and 7B.

The processor 115 may perform an overall control operation of the electronic apparatus 100. Specifically, the processor 115 may obtain information on first illuminance corresponding to an external lighting device in the indoor space through an illuminance sensor of the sensor 113. The information on first illuminance is information on illuminance detected by a light source emitted from an external lighting in the indoor space in which the electronic apparatus 100 is position and may be expressed, for example, in a unit of lux.

According to an embodiment, the processor 115 may obtain information on illuminance obtained through the illuminance sensor before the projection image is projected from the projecting part 111 as the information on first illuminance corresponding to an external lighting device in the indoor space. In the meantime, the embodiment is not limited thereto and while an image is projected from the projecting part 111, the processor 115 may obtain the information on the first illuminance corresponding to an external lighting device by analyzing information on illuminance obtained through the illuminance sensor.

In addition, the processor 115 may obtain the information on the second illuminance corresponding to an image projected by the projecting part 111 through the illuminance sensor. The information on the second illuminance is information on illuminance in which an image projected from the projecting part 111 is reflected to a projection region and detected by the illuminance sensor and may be expressed in a unit of, for example, lux.

In addition, the processor 115 may control the light source of the lighting part 114 based on the information on first illuminance and the information on second illuminance.

According to an embodiment, based on the first illuminance being less than a first threshold value and the second illuminance is greater than or equal to a second threshold value, the processor 115 may control the lighting part 114 to increase the brightness of the lighting part 114. Here, the first threshold value may mean a maximum illuminance value that the indoor space are identified as being dark and may be preset by a user or a manufacturer. The second threshold value may mean a minimum illuminance value that the projection image is identified to be bright to cause glare and may be preset by a user or a manufacturer. According to an embodiment of the disclosure, the second threshold value may be changed by a value of the first illuminance and may be, for example, the first threshold value and the second threshold value may be values that a ratio (the second illuminance:the first illuminance) is (10:1). For example, the processor 115 may effectively prevent glare of the user by controlling the lighting part 114 to slowly increase the brightness of the light source of the lighting part 114. That is, if the indoor space are dark but a projection image is bright, the processor 115 may prevent glare of the user by increasing brightness of the light source of the lighting part 114. In the meantime, the embodiment is not limited thereto and the processor 115 may control the lighting part 114 to decrease brightness of an image projected by the projecting part 111 while controlling the lighting part 114.

According to an embodiment, based on the first illuminance being less than a first threshold value and the second illuminance being less than a third threshold value, the processor 115 may control the lighting part 114 to lower brightness of the light source. Here, the third threshold may mean a maximum illuminance value that a projection image is identified as being dark so that a user may feel inconvenience while watching and may be preset by a user or a manufacturer. That is, when the indoor space are dark and brightness of a projection image is dark, the processor 115 may reduce battery consumption of the electronic apparatus 100 by reducing the brightness of the light source of the lighting part 114.

According to an embodiment, when the light source of the lighting part 114 is emitting light, the information on first illuminance may be information on illuminance detected by an external lighting device in the indoor space and the light source of the lighting part 114, but the embodiment is not limited thereto. That is, the information on third illuminance corresponding to the light source of the lighting part 114 may be further obtained. The information on third illuminance is an example of information on illuminance detected by the light source of the lighting part 114 and may be expressed in a unit of Lux. In this example, the information on first illuminance may be information on illuminance corresponding to an external lighting device excluding the light source of the lighting part 114. The information on third illuminance may be obtained by illuminance sensor but is not limited thereto. For example, as brightness of the light source of the lighting part 114 is controlled by the processor 115, the processor 115 may obtain the information on third illuminance through the brightness level of the lighting part 114 even without illuminance detection.

When the information on third illuminance is obtained, the processor 115 may control the light source of the lighting part 114 based on the information on first illuminance, the information on second illuminance, and the information on third illuminance. For example, the processor 115 may control the light source of the lighting part 114 such that the sum of the value of the first illuminance and the value of the third illuminance is greater than or equal to a predetermined ratio of the value of the second illuminance. For example, the processor 115 may control the light source of the lighting part 114 such that ratio of the sum of the values of the first illuminance and the values of the third illuminance to the value of second illuminance is greater than or equal to ($\frac{1}{10}$) ratio.

In an embodiment, the processor 115 may control the light source of the lighting part 114 based on the location of the user. Specifically, the processor 115 may obtain information on first location for a projection region corresponding to an image projected by the projecting part 111 through the distance sensor of the sensor 113. The information on first location may include information on space for the projection region and information on distance between the projection region and the electronic apparatus 100. In addition, the processor 115 may obtain information on second location for the user through the distance sensor. The information on second location may include information on space for the user, information on the distance between the user and the electronic apparatus 100, and information on movement for the user. For example, the distance sensor may be implemented with a ToF sensor.

Based on the information on the first location and the information on the second location being obtained, the processor 115 may obtain information on distance between the projection region and the user through the information on the first location and the information on the second location. In addition, the processor 115 may control the light source of the lighting part 114 based on the information on the distance between the projection region and the user, the information on the first illuminance, and the information on the second illuminance. According to an embodiment, the processor 115 may obtain the information on fourth illuminance of the projection image at the location of the user based on the information on distance between the projection region and the user and the information on the second illuminance. For example, the information on the fourth illuminance may be a value of (ANSI Lumen*APL of the projected image (1/square of the distance between the electronic apparatus 100 and the projection region)*reflectance of the projection region*(1/(square of the projection region and the distance between the user)). The ANSI Lumen is information on the average brightness of the projection image obtained through the information on the second illuminance, and the APL of the projection image may be the average picture level of the projection image and may be obtained through the metadata of the projection image. The reflectance of the projection region may be information on the reflectance of the surface of the region onto which the projection image is projected and may generally be the reflectance of the screen surface onto which the projection image is projected.

Based on the information on the fourth illuminance being obtained, the processor 115 may control the light source of the lighting part 114 such that a ratio of the first illuminance to the fourth illuminance is greater than or equal to (1/10) ratio. Here, the information on the first illuminance may be information on illuminance detected by an external lighting device in the indoor space and a light source of the lighting part 114, and based on information on third illuminance corresponding to the light source of the lighting part 114 being obtained, the processor 115 may control the light source of the lighting part 114 such that ratio of the sum of values of the first illuminance and the third illuminance to the value of the fourth illuminance is equal to or greater than (1/10) ratio, and in this case, the information on first illuminance may be information on illuminance corresponding to an external lighting device excluding the light source of the lighting part 114. As an embodiment, based on the information on the fourth illuminance being obtained, if the first illuminance is less than the first threshold value and the fourth illuminance is greater than or equal to the second threshold value, the processor 115 may control the lighting part 114 to increase the brightness of the light source of the lighting part 114. Here, the first threshold value and the second threshold value may be a threshold value in which the ratio of the first illuminance to (fourth illuminance is a ratio of (1/10) ratio.

In one embodiment, the processor 115 may control the light source of the lighting part 114 by further using the information on the image projected by the projecting part 111 or may correct the image projected by the projecting part 111. The processor 115 may receive the information on the image together from an external server and the like, from which the processor 115 may receive the image, and the information of the image may include APL information of the image, histogram information of the image, information on a background screen/object of the image, and information on whether the image is a high dynamic range (HDR) image. The HDR is a technology of upscaling the range of brightness by making a bright portion in a digital image brighter and making a dark portion in a digital image darker to make the image seen similar to the image actually seen by a user with the actual eyes. In the meantime, the embodiment is not limited thereto and the information on the image may include various information on the image.

According to an embodiment, based on identifying that the image projected from the projecting part 111 is high dynamic range (HDR) image through the information on the image, the processor 115 may control the lighting part 114 to increase brightness of the light source of the lighting part 114. That is, if the image projected by the projecting part 111 is an HDR image, glare may occur due to an object included in the image, glare may be prevented by increasing the brightness of the light source of the lighting part 114.

According to an embodiment, based on identifying, through the information on the image, that brightness of a background screen of the image projected by the projecting part 111 is less than preset brightness and an object included in the image moves, the processor 115 may control the lighting part 114 to increase brightness of the light source of the lighting part 114. In addition, the processor 115 may control the projecting part 111 to reduce brightness of an object of the image projected from the projecting part 111 and may control the projecting part 111 to lower a gain value to optically compensate for front-end signal of optical output.

That is, even if a background screen of an image projected from the projecting part 111 is dark, but an object moves, a color breaking phenomenon may occur to cause glare of the user, and the glare of the user may be prevented by increasing the brightness of the light source of the lighting part 114.

In an embodiment, the processor 115 may control the light source of the lighting part 114 by further using information on age of the user. For example, the processor 115 may obtain information on age of the user through a UI for obtaining information on age of the user. The processor 115 may control the lighting part 114 to further increase the brightness of the light source of the lighting part 114 than the above-described embodiment based on it is identified that the age of the user is old age (e.g., age of 60 or more) or young age (e.g., age of 13 or less) through the information of the age information. That is, in the case of the age of the user is the young age or the old age, as degree of glare may be greater than that of a normal user, the glare of the user may be prevented by further increasing the brightness of the light source of the lighting part 114 based on the age of the user.

In the embodiment described above, it has been described that the illuminance sensor is included in the electronic apparatus 100, but the embodiment is not limited thereto. According to an embodiment, the processor 115 may obtain the information on illuminance based on the external illuminance sensor installed in the indoor space.

In an embodiment, the processor 115 may obtain information on illuminance by using an external illuminance sensor and an illuminance sensor included in the electronic apparatus 100 together. In an embodiment, the processor 115 may obtain information on illuminance by using one illuminance sensor with better performance among the external illuminance sensor and the included in the electronic apparatus 100.

According to an embodiment, based on an external illuminance sensor included in a portable terminal device of a user being used, the processor 115 may use information on illuminance obtained by external illuminance sensor positioned in a direction corresponding to an image projected by the projecting part 111. In addition, according to an embodiment, based on an external illuminance sensor included in a portable terminal device of a user being used, an value of illuminance reflected from a projection region of an image projected from the projecting part 111 may be detected, or a region desired by the user may be intensively sensed, thereby information on illuminance having a higher accuracy may be obtained.

Figure 2B:
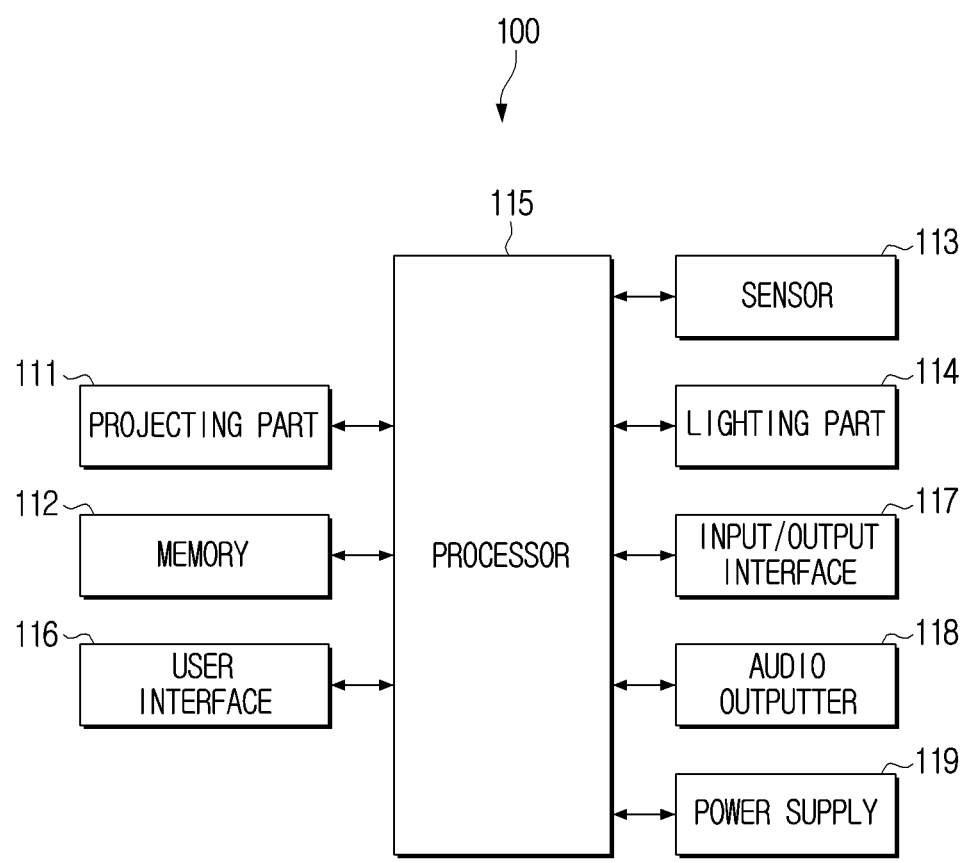
FIG. 2B is a block diagram illustrating a detailed configuration of FIG. 2A.

FIG. 2B is a block diagram illustrating the configuration of the electronic apparatus 100 of FIG. 2A in detail.

Referring to FIG. 2B, the electronic apparatus 100 may include at least one of the projecting part 111, the memory 112, the sensor 113, the lighting part 114, the processor 115, a user interface 116, an input/output interface 117, an audio outputter 118 or a power supply 119. The description of the projection part 111, the memory 112, the sensor part 113, the illumination part 114, and the processor 115 in FIG. 2A are omitted. The configuration illustrated in FIG. 2B is only an example, from which some configurations may be omitted, and to which a new configuration may be added.

The projecting part 111 may be a component that projects the image to the outside. The projecting part 111 according to an embodiment of the disclosure may be implemented in various projection types (e.g., cathode-ray tube (CRT) type, liquid crystal display (LCD) type, digital light processing (DLP) type, or laser type). As an example, the CRT type has basically the same principle as the principle of a CRT monitor. The CRT type may display the image on the screen by enlarging the image by using a lens in front of a cathode-ray tube (CRT). The CRT type may be divided into a one-tube type and a three-tube type based on the number of cathode-ray tubes, and in the three-tube type, the cathode-ray tubes of red, green, and blue are separated from one another.

For an example, the LCD type may display the image by allowing light emitted from a light source to pass through a liquid crystal. The LCD type may be divided into a single-panel type and a three-panel type. When the three-plate type, the light emitted from the light source may be separated into red, green and blue in a dichroic mirror (which is a mirror that reflects only light of a specific color and allows the rest to pass therethrough), may then pass through the liquid crystal, and may then be collected into one place again.

For still an example, the DLP type may display the image by using a digital micromirror device (DMD) chip. The DLP type projecting part may include a light source, a color wheel, the DMD chip, a projection lens, etc. Light emitted from the light source may be colored as passing through a rotating color wheel. Light passed through the color wheel may be input into the DMD chip. The DMD chip may include numerous micromirrors and reflect light input to the DMD chip. The projection lens may expend light reflected from the DMD chip to the image size.

For yet an example, the laser type may include a diode pumped solid state (DPSS) laser and a galvanometer. The laser type that outputs various colors may use a laser in which three DPSS lasers are respectively installed for red, green, and blue (RGB) colors, and their optical axes overlap each other by using a special mirror. The galvanometer may include a mirror and a high-power motor and move the mirror at a high speed. For example, the galvanometer may rotate the mirror at up to 40 KHz/sec. The galvanometer may be mounted in a scanning direction, and in general, a projector performs planar scanning, and the galvanometer may thus also be disposed by being divided into x and y axes.

The projecting part 111 may include light sources of various types. For example, the projecting part 111 may include at least one light source of a lamp, a light emitting diode (LED), and a laser.

The projecting part 111 may output the image in a screen ratio of 4:3, a screen ratio of 5:4, and a wide screen ratio of 16:9, based on a purpose of the electronic apparatus 100, the user's setting or the like, and may output the image having various resolutions such as wide video graphics array WVGA (854*480 pixels), super video graphics array SVGA (800*600 pixels), extended graphics array XGA (1024*768 pixels), wide extended graphics array WXGA (1280*720 pixels), WXGA (1280*800 pixels), super extended graphics array SXGA (1280*1024 pixels), ultra extended graphics array UXGA (1600*1200 pixels) and full high-definition HD (1920*1080 pixels), based on the screen ratio.

The projecting part 111 may perform various functions for adjusting the output image under the control of the processor 115. For example, the projecting part 111 may perform a zoom function, the keystone function, a quick corner (or four corner) keystone function and a lens shift function, or the like.

The projecting part 111 may enlarge or reduce the image based its distance (i.e., projection distance) to the screen. That is, the projecting part 111 may perform the zoom function based on its distance to the screen. The zoom function may include a hardware method of adjusting a screen size by moving a lens, and a software method of adjusting the screen size by cropping the image, or the like. In case that the zoom function is performed, it is necessary to adjust a focus of the image. For example, a method of adjusting the focus may include a manual focusing method, an electric focusing method, etc. The manual focusing method may indicate a method of manually adjusting the focus, and the electric focusing method may indicate a method in which the projector automatically adjusts the focus by using a motor built therein when performing the zoom function. When performing the zoom function, the projecting part 111 may provide a digital zoom function through software or may provide an optical zoom function in which the zoom function is performed by moving the lens by using a driving part.

In addition, the projecting part 111 may perform the keystone correction function. When a height is not correct for a front projection, the screen may be distorted up or down. The keystone correction function may be a function of correcting a distorted screen. For example, in case that the distortion occurs on the screen in a horizontal direction, the distortion may be corrected using a horizontal keystone, and in case that the distortion occurs on the screen in a vertical direction, the distortion may be corrected using a vertical keystone. The quick corner (or four corner) keystone correction function may be a function of correcting the screen in case that a balance between corner areas of the screen is not appropriate while a central area of the screen is normal. The lens shift function may be a function of moving the screen as it is in case that the screen is outside a screen area.

The projecting part 111 may provide the zoom/keystone/focusing functions by automatically analyzing a surrounding environment and a projection environment without the user input. The projecting part 111 may automatically provide the zoom/keystone/focusing functions, based on the distance between an electronic apparatus 100 and the screen, information about a space where the electronic apparatus 100 is currently positioned, information about an amount of ambient light, or the like, detected by the sensor (e.g., Time-of-Flight (ToF) sensor, distance sensor, infrared sensor, or illumination sensor).

In addition, the projecting part 111 may provide an illumination function by using the light source. In particular, the projecting part 111 may provide the illumination function by outputting the light source by using the LED. In an example, the projecting part 111 may include one LED, and in an example, the electronic apparatus may include the plurality of LEDs. The projecting part 111 may output the light source by using a surface-emitting LED in an implementation example. The surface-emitting LED may be an LED in which an optical sheet is disposed on an upper side of the LED for the light source to be evenly dispersed and output. When the light source being output through the LED, the light source may be evenly dispersed through the optical sheet, and the light source dispersed through the optical sheet may be introduced into a display panel.

The projecting part 111 may provide the user with a dimming function for adjusting intensity of the light source. The projecting part 111 may control the LED to output the intensity of the light source that corresponds to a received user input when receiving the user input for adjusting the intensity of the light source from the user through the user interface 116 (e.g., touch display button or dial).

In addition, the projecting part 111 may provide the dimming function, based on the content analyzed by the processor 115 without the user input. The projecting part 111 may control the LED to output the intensity of the light source, based on information (e.g., content type or content brightness) on the currently-provided content.

The projecting part 111 may control a color temperature by the control of the processor 115. The processor 115 may control a color temperature based on the content. In case that it is identified that the content is to be output, the processor 115 may obtain color information for each frame of the content whose output is determined. The processor 115 may then control the color temperature based on the obtained color information for each frame. The processor 115 may obtain at least one main color of the frame based on the color information for each frame. The processor 115 may then adjust the color temperature based on the obtained at least one main color. For example, the color temperature that the processor 115 may adjust may be divided into a warm type or a cold type. The frame to be output (hereinafter, output frame) may include a fire scene. The processor 115 may identify (or obtain) that the main color is red based on the color information included in the current output frame. The processor 115 may then identify the color temperature corresponding to the identified main color (red). The color temperature corresponding to the red color may be the warm type. The processor 114 may use an artificial intelligence model to obtain the color information or main color of the frame. According to an embodiment of the disclosure, the artificial intelligence model may be stored in the electronic apparatus 100 (e.g., memory 112). According to an embodiment of the disclosure, the artificial intelligence model may be stored in an external server capable to communicate with the electronic apparatus 100.

The electronic apparatus 100 may be interlocked with the external device to control the illumination function. The electronic apparatus 100 may receive illumination information from the external device. The illumination information may include at least one of brightness information or color temperature information, set by the external device. The external device may be a device connected to the same network as the electronic apparatus 100 (e.g., internet of things (IoT) device included in the same home/work network) or a device not connected to the same network as the electronic apparatus 100 but capable of communicating with the electronic apparatus (e.g., remote control server). For example, an external illumination device (e.g., IoT device) included in the same network as the electronic apparatus 100 may output red light having brightness of 50. The external lighting device (e.g., IoT device) may directly or indirectly transmit the illumination information (e.g., information indicating that the red light is being output with the brightness of 50) to the electronic apparatus 100. The electronic apparatus 100 may control the output of the light source based on the illumination information received from the external illumination device. For example, in case that the illumination information received from the external illumination device includes the information indicating that the red light is output with the brightness of 50, the electronic apparatus 100 may output the red light having the brightness of 50.

The electronic apparatus 100 may control the illumination function based on biometric information. The processor 115 may obtain the user's biometric information. The biometric information may include at least one of the body temperature, heart rate, blood pressure, breath or electrocardiogram of the user. The biometric information may include various information other than the aforementioned information. For example, the electronic apparatus may include a sensor for measuring the biometric information. The processor 115 may obtain the biometric information of the user through the sensor, and control the output of the light source based on the obtained biometric information. For an example, the processor 115 may receive the biometric information from the external device through the input/output interface 116. The external device may be the portable communication device (e.g., smart phone or wearable device) of the user. The processor 114 may obtain the biometric information of the user from the external device, and control the output of the light source based on the obtained biometric information. In an example, the electronic apparatus may identify whether the user is sleeping and the processor 114 may control the output of the light source based on the user's biometric information in case that it is identified that the user is sleeping (or preparing to sleep).

The memory 112 may store at least one instruction on the electronic apparatus 100. In addition, the memory 112 may store an operating system (O/S) for driving the electronic apparatus 100. The memory 112 may also store various software programs or applications for operating the electronic apparatus 100 in various examples of the disclosure. Further, the memory 112 may include a semiconductor memory such as a flash memory, or a magnetic storing medium such as a hard disk.

The memory 112 may store various software modules for operating the electronic apparatus 100 in the various examples of the disclosure, and the processor 115 may control the operation of the electronic apparatus 100 by executing the various software modules stored in the memory 112. That is, the memory 112 may be accessed by the processor 115, and the processor 115 may perform readout, recording, correction, deletion, update and the like of data in the memory 112.

In the disclosure, the term "memory 112" may include the memory 112, a read only memory (ROM)(not shown) or a random access memory (RAM)(not shown) in the processor 114, or a memory card (not shown) (for example, a micro secure digital (SD) card or a memory stick) mounted in the electronic apparatus 100.

The user interface 116 may include various types of input devices. For example, the user interface 116 may include a physical button. The physical button may include a function key, a direction key (e.g., a four-direction key), or a dial button. In an example, the physical button may be implemented as a plurality of keys. In an example, the physical button may be implemented as one key. In case that the physical button is implemented as one key, the electronic apparatus 100 may receive the user input in which the one key is pressed for a critical time or longer. When receiving the user input in which one key is pressed for the critical time or longer, the processor 115 may perform a function corresponding to the user input. For example, the processor 115 may provide the illumination function based on the user input.

In addition, the user interface 116 may receive the user input by using a non-contact method. In the case of receiving the user input by using a contact method, a physical force may be required to be transmitted to the electronic apparatus. There may thus be a need for a method of controlling the electronic apparatus regardless of the physical force. The user interface 116 may receive a user gesture and may perform an operation corresponding to the received user gesture. The user interface 116 may receive the user gesture through the sensor (e.g., image sensor or infrared sensor).

In addition, the user interface 116 may receive the user input by using a touch method. For example, the user interface 116 may receive the user input through a touch sensor. In an example, the touch method may be implemented as the non-contact method. For example, the touch sensor may determine whether a user body approaches within a critical distance. The touch sensor may identify the user input even in case that the user does not touch the touch sensor. In an example, the touch sensor may identify the user input in which the user touches the touch sensor.

The electronic apparatus 100 may receive the user input in various ways other than the user interface described above. In an example, the electronic apparatus 100 may receive the user input from an external remote control device. The external remote control device may be a remote control device corresponding to the electronic apparatus 100 (e.g., control device dedicated to the electronic apparatus) or the portable communication device (e.g., smartphone or wearable device) of the user. The portable communication device of the user may store an application for controlling the electronic apparatus. The portable communication device may obtain the user input from the application stored therein, and transmit the obtained user input to the electronic apparatus 100. The electronic apparatus 100 may receive the user input from the portable communication device, and perform an operation corresponding to the user's control command The electronic apparatus 100 may receive the user input by using voice recognition. In an embodiment of the disclosure, the electronic apparatus 100 may receive a user voice through the microphone included in the electronic apparatus 100. In an embodiment of the disclosure, the electronic apparatus 100 may receive the user voice from the microphone or the external device. The external device may obtain the user voice through the microphone of the external device, and transmit the obtained user voice to the electronic apparatus 100. The user voice transmitted from the external device may be audio data or digital data converted from the audio data (e.g., audio data converted to a frequency domain). The electronic apparatus 100 may perform an operation corresponding to the received user voice. The electronic apparatus 100 may receive the audio data corresponding to the user voice through the microphone. The electronic apparatus 100 may then convert the received audio data to the digital data. The electronic apparatus 100 may then convert the converted digital data to text data by using a speech-to-text (STT) function. In an embodiment of the disclosure, the speech-to-text (STT) function may be directly performed by the electronic apparatus 100.

According to an embodiment of the disclosure, the speech-to-text (STT) function may be performed by the external server The electronic apparatus 100 may transmit the digital data to the external server. The external server may convert the digital data to the text data, and obtain control command data based on the converted text data. The external server may transmit the control command data (which may here also include the text data) to the electronic apparatus 100. The electronic apparatus 100 may perform an operation corresponding to the user voice based on the obtained control command data.

The electronic apparatus 100 may provide a voice recognition function by using one assistance (or an artificial intelligence agent such as Bixby™), which is only an example, and the electronic apparatus 100 may provide the voice recognition function by using a plurality of assistances. The electronic apparatus 100 may provide the voice recognition function by selecting one of the plurality of assistances based on a trigger word corresponding to the assistance or a specific key included in a remote controller.

The electronic apparatus 100 may receive the user input by using a screen interaction. The screen interaction may indicate a function in which the electronic apparatus identifies whether a predetermined event is generated through the image projected to the screen (or projection plane), and obtains the user input based on the predetermined event. The predetermined event may be an event in which a predetermined object is identified at a specific position (e.g., position to which the UI for receiving the user input is projected). The predetermined object may include at least one of a user body part (e.g., finger), a pointer, or a laser point. The electronic apparatus 100 may identify that the electronic apparatus 100 receives the user input for selecting the projected UI in case that it is identified that the predetermined object exists at the position corresponding to the projected UI. For example, the electronic apparatus 100 may project a guide image displaying the UI on the screen. The electronic apparatus 100 may then identify whether the user selects the projected UI. The electronic apparatus 100 may identify that the user selects the projected UI in case that the predetermined event is identified at the position of the projected UI. The projected UI may include at least one item. The electronic apparatus 100 may perform spatial analysis to identify whether the predetermined event exists at the position of the projected UI. The electronic apparatus 100 may perform the spatial analysis through the sensor (e.g., image sensor, infrared sensor, ToF sensor, or distance sensor). The electronic apparatus 100 may identify whether the predetermined event is generated at the specific position (i.e., position to which the UI is projected) by performing the spatial analysis. In addition, in case that it is identified that the predetermined event is generated at the specific position (i.e., position to which the UI is projected), the electronic apparatus 100 may identify that the electronic apparatus 100 receives the user input for selecting the UI corresponding to the specific position.

The input/output interface 117 is a component for inputting or outputting at least one of an audio signal or an image signal. The input/output interface 117 may receive at least one of the audio signal or the image signal from the external device, and output the control command to the external device.

The input/output interface 117 according to an embodiment of the disclosure may be implemented as a wired input/output interface of at least one of a high definition multimedia interface (HDMI), a mobile high-definition link (MHL), a universal serial bus (USB), a USB C-type, a display port (DP), a thunderbolt, a video graphics array (VGA) port, a red-green-blue (RGB) port, a D-subminiature (D-SUB) or a digital visual interface (DVI). In an example, the wired input/output interface may be implemented as an interface inputting or outputting only the audio signal and an interface inputting or outputting only the image signal, or implemented as one interface inputting or outputting both the audio signal and the image signal.

In addition, the electronic apparatus 100 may receive the data through the wired input/output interface, which is only an embodiment of the disclosure, and the electronic apparatus 100 may receive power through the wired input/output interface. For example, the electronic apparatus 100 may receive power from an external battery through the USB C-type, or receive power from an outlet through a power adapter. For an example, the electronic apparatus may receive power from the external device (e.g., laptop computer or monitor) through the display port (DP).

The input/output interface 117 according to an embodiment of the disclosure may be implemented as the wireless input/output interface that performs the communication by using at least one of communication methods such as wireless-fidelity (Wi-Fi), Wi-Fi direct, Bluetooth, ZigBee, third generation (3G), 3rd generation partnership project (3GPP), or long term evolution (LTE). In an example, the wireless input/output interface may be implemented as the interface inputting or outputting only the audio signal and the interface inputting or outputting only the image signal, or implemented as one interface inputting or outputting both the audio signal and the image signal.

In addition, the audio signal may be input through the wired input/output interface, and the image signal may be input through a wireless input/output interface. Alternatively, the audio signal may be input through the wireless input/output interface, and the image signal may be input through the wired input/output interface.

In an embodiment of the disclosure, the input/output interface 117 may receive brightness information from an external lighting device in the indoor space. Then, the input/output interface 117 may transmit control commands to the external lighting device to control the brightness of the external lighting device in the indoor space.

The audio outputter 118 is a component that outputs the audio signal. In particular, the audio outputter 118 may include an audio output mixer, an audio signal processor, and an audio output module. The audio output mixer may mix the plurality of audio signals to be output as at least one audio signal. For example, the audio output mixer may mix an analog audio signal and another analog audio signal (e.g., analog audio signal received from the outside) as at least one analog audio signal. The audio output module may include the speaker or an output terminal. According to an embodiment, the audio output module may include the plurality of speakers. In this case, the audio output module may be disposed in the main body, and audio emitted while covering at least a portion of a diaphragm of the audio output module may pass through a waveguide to be transmitted to the outside the main body. The audio output module may include a plurality of audio output units, and the plurality of audio output units may be symmetrically arranged on the exterior of the main body, and accordingly, the audio may be emitted to all directions, i.e. all directions in 360 degrees.

The power supply 119 may receive power from the outside and supply power to the various components of the electronic apparatus 100. The power supply 119 according to an embodiment of the disclosure may receive power in various ways. In an example, the power supply 119 may receive power by using the connector 130 as illustrated in FIG. 1. In addition, the electronic apparatus may receive power by using a direct current (DC) power cord of 220V. However, the disclosure is not limited thereto, and the power supply 119 may receive power by using a USB power cord, or may receive power by using a wireless charging method.

In addition, the power supply 119 may receive power by using an internal battery or the external battery. The power supply 119 according to an embodiment of the disclosure may receive power through the internal battery. For example, the power supply 119 may charge power of the internal battery by using at least one of the DC power cord of 220V, the USB power cord, or a USB C-Type power cord, and may receive power through the charged internal battery. In addition, the power supply 118 according to an embodiment of the disclosure may receive power through the external battery. For example, the power supply 119 may receive power through the external battery in case that the electronic apparatus and the external battery is connected through various wired communication methods such as the USB power code, the USB C-type power code, or a socket groove. That is, the power supply 119 may directly receive power from the external battery, or charge the internal battery through the external battery and receive power from the charged internal battery.

The power supply 119 according to the disclosure may receive power by using at least one of the aforementioned plurality of power supply methods.

With respect to power consumption, the electronic apparatus 100 may have the power consumption of a predetermined value (e.g., 43 W) or less due to a socket type, another standard, etc. The electronic apparatus 100 may change power consumption to reduce the power consumption when using the battery. That is, the electronic apparatus 100 may change the power consumption based on the power supply method, power usage amount, or the like.

The electronic apparatus 100 according to an embodiment of the disclosure may provide various smart functions.

The electronic apparatus 100 may be connected to a portable terminal device controlling the electronic apparatus 100, and the screen output from the electronic apparatus 100 may be controlled by the user input which is input from the portable terminal device. For example, the portable terminal device may be implemented as a smartphone including a touch display, the electronic apparatus 100 may receive screen data provided by the portable terminal device from the portable terminal device and output the data, and the screen output by the electronic apparatus 100 may be controlled based on the user input that is input from the portable terminal device.

The electronic apparatus 100 may be connected to the portable terminal device by using various communication methods such as miracast, airplay, wireless Desktop Experience (DeX) and a remote personal computer (PC) method, and may share a content or music, provided by the portable terminal device.

In addition, the portable terminal device and the electronic apparatus 100 may be connected to each other by various connection methods. In an example, the portable terminal device may search for the electronic apparatus 100 and perform wireless connection therebetween, or the electronic apparatus 100 may search for the portable terminal device and perform the wireless connection therebetween. The electronic apparatus 100 may then output the content provided from the portable terminal device.

In an example, the electronic apparatus 100 may output the content or music being output from the portable terminal device in case that the portable terminal device is positioned around the electronic apparatus and the predetermined gesture (e.g., motion tap view) is then detected through the display of the portable terminal device, while the specific content or music is being output from the portable terminal device.

In an example, the electronic apparatus 100 may output the content or music being output from the portable terminal device in case that it is detected that the portable terminal device is positioned around the electronic apparatus 100 by a predetermined distance or less (e.g., non-contact tap view), or the portable terminal device touches the electronic apparatus 100 twice at short intervals (e.g., contact tap view) in the state where the specific content or music is being output from the portable terminal device.

In the above example, the screen provided by the portable terminal device is the same as the screen provided by the electronic apparatus 100. However, the disclosure is not limited thereto. That is, in case that the portable terminal device and the electronic apparatus 100 are connected to each other, the portable terminal device may output a first screen provided by the portable terminal device, and the electronic apparatus 100 may output a second screen provided by the portable terminal device, which is different from the first screen. For example, the first screen may be a screen provided by a first application installed in the portable terminal device, and the second screen may be a screen provided by a second application installed in the portable terminal device. For example, the first screen and the second screen may be the screens different from each other that are provided by one application installed in the portable terminal device. In addition, for example, the first screen may be a screen including the UI in a remote controller form for controlling the second screen.

The electronic apparatus 100 according to the disclosure may output a standby screen. For example, the electronic apparatus 100 may output the standby screen in case that the electronic apparatus 100 and the external device are not connected to each other or in case that there is no input received from the external device for the predetermined time. A condition for the electronic apparatus 100 to output the standby screen is not limited to the above-described example, and the standby screen may be output based on various conditions.

The electronic apparatus 100 may output the standby screen in the form of a blue screen, and the disclosure is not limited thereto. For example, the electronic apparatus 100 may obtain an atypical object by extracting only the shape of a specific object from the data received from the external device, and output the standby screen including the obtained atypical object.

Figure 3:
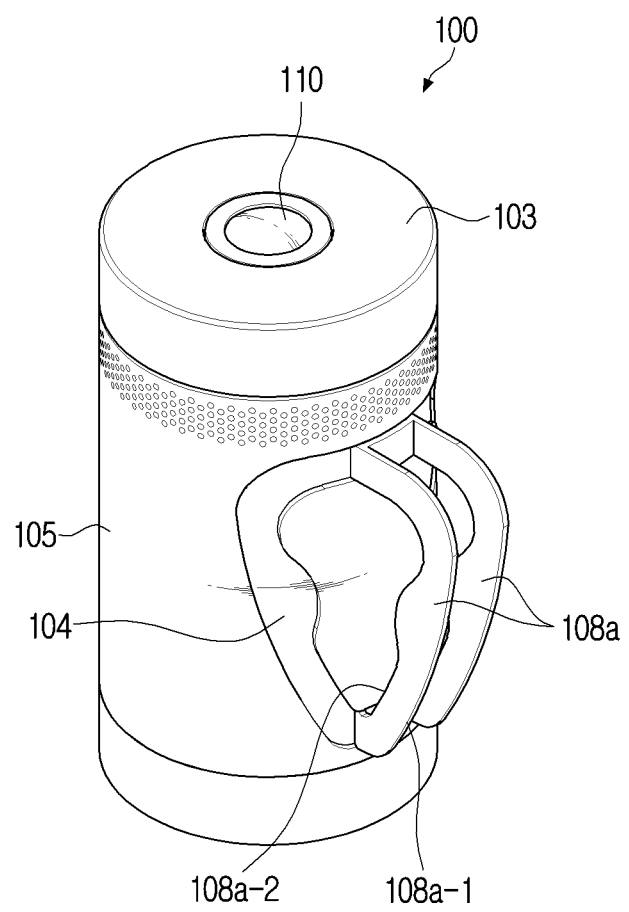
FIG. 3 is a perspective view illustrating an exterior of an electronic apparatus according to other embodiments of the disclosure.

FIG. 3 is a perspective view illustrating the exterior of the electronic apparatus 100 in an embodiment of the disclosure.

Referring to FIG. 3, the electronic apparatus 100 may include a support (or a "handle") 108a.

The support 108a in various examples may be the handle or a ring that is provided for the user to grip or move the electronic apparatus 100. Alternatively, the support 108a may be a stand that supports the main body 105 while the main body 105 is laid sideways.

As illustrated in FIG. 3, the support 108a may have a hinge structure for the support to be coupled to or separated from an outer peripheral surface of the main body 105, and may be selectively separated from or fixed to the outer peripheral surface of the main body 105 based on the user's need. The number, shape, or disposition structure of the support 108a may be implemented in various ways without restriction. Although not shown in the drawing, the support 108a may be built in the main body 105 and taken out and used by the user based on the user need. Alternatively, the support 108a may be implemented as a separate accessory and attached to or detached from the electronic apparatus 100.

The support 108a may include a first support surface 108a-1 and a second support surface 108a-2. The first support surface 108a-1 may be a surface that faces the outside of the main body 105 while the support 108a is separated from the outer peripheral surface of the main body 105, and the second support surface 108a-2 may be a surface that faces the inside of the main body 105 while the support 108a is separated from the outer peripheral surface of the main body 105.

The first support surface 108a-1 may be developed from the lower portion to upper portion of the main body 105 to be farther away from the main body 105, and the first support surface 108a-1 may have a flat or uniformly curved shape. The first support surface 108a-1 may support the main body 105 in case the electronic apparatus 100 is held in such a manner that the outer side surface of the main body 105 is in contact with the bottom, i.e., in case that the electronic apparatus 100 is disposed in such a manner that the projection lens 110 is toward the front. In an example in which the electronic apparatus 100 includes two or more supports 108a, the head 103 and the projection angle of the projection lens 110 may be adjusted by adjusting the interval or hinge opening angle of the two supports 108a.

The second support surface 108a-2 may be a surface touched by the user or an external holding structure in case that the support 108a is supported by the user or the external holding structure, and may have a shape corresponding to a gripping structure of the user's hand or the external holding structure for the electronic apparatus 100 not to slip in case that the electronic apparatus 100 is supported or moved. The user may move the electronic apparatus 100 by making the projection lens 110 face toward the front, fixing the head 103 and holding the support 108a, and use the electronic apparatus 100 like a flashlight.

Figure 4:
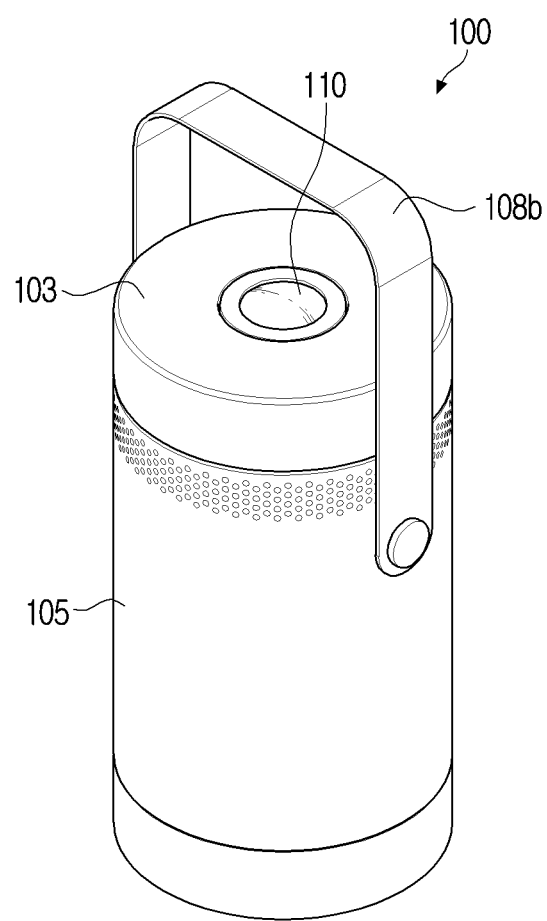
FIG. 4 is a perspective view illustrating an exterior of an electronic apparatus according to yet other embodiments of the disclosure.

The support groove 104 may be a groove structure which is provided in the main body 105 and accommodates the support 108a in case that the support 108a is not used, and as illustrated in FIG. 4, the support groove 104 may be implemented as a groove structure corresponding to the shape of the support 108a in the outer peripheral surface of the main body 105. By using the support groove 104, the support 108a may be stored on the outer peripheral surface of the main body 105 in case that the support 108a is not used, and the outer peripheral surface of the main body 105 may be maintained to be slick.

Alternatively, the support 108a may be stored inside the main body 105 and may be taken out to the outside of the main body 105 in case that the support 108a is needed. In this case, the support groove 104 may be led into the inside of the main body 105 to accommodate the support 108a, and the second support surface 108a-2 may have a door (not shown) that adheres to the outer peripheral surface of the main body 105 or opens or closes the separate support groove 104.

Although now shown in the drawing, the electronic apparatus 100 may include various kinds of accessories that are helpful in using or storing the electronic apparatus 100. For example, the electronic apparatus 100 may include a protection case for the electronic apparatus 100 to be easily carried while being protected. Alternatively, the electronic apparatus 100 may include a tripod that supports or fixes the main body 105, or a bracket that may be coupled to the outer surface of the electronic apparatus and fix the electronic apparatus 100.

FIG. 4 is a perspective view illustrating the exterior of the electronic apparatus 100 in still an example of the disclosure.

Referring to FIG. 4, the electronic apparatus 100 may include a support (or a "handle") 108b.

The support 108b in various examples may be the handle or the ring that is provided for the user to grip or move the electronic apparatus 100. Alternatively, the support 108b may be the stand that supports the main body 105 to be oriented at any angle while the main body 105 is laid sideways.

Figure 5:
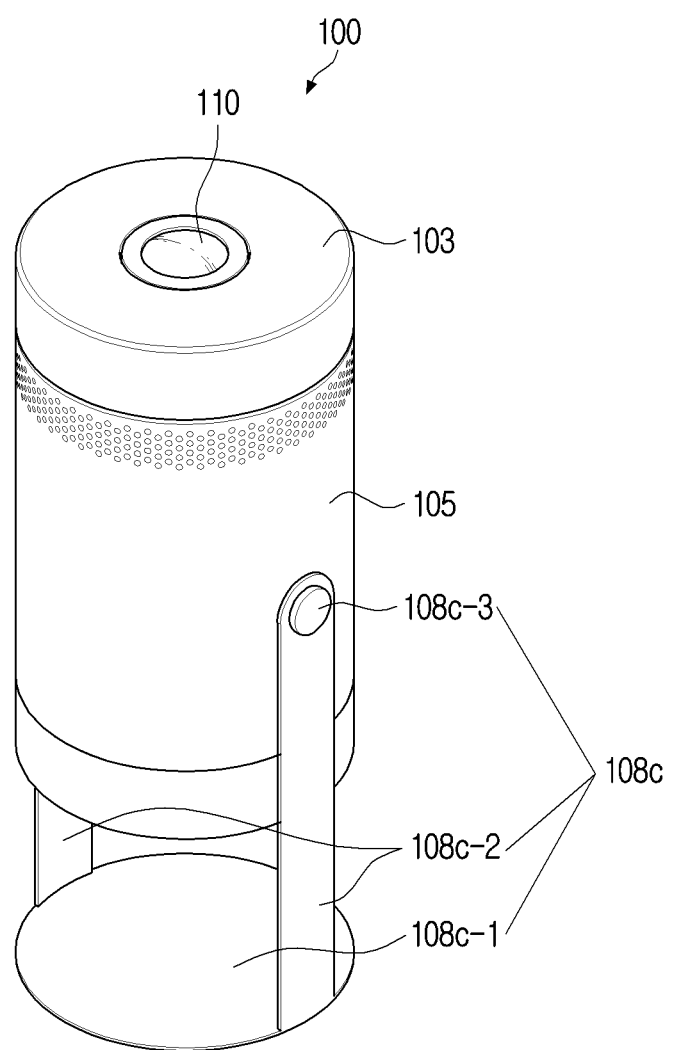
FIG. 5 is a perspective view illustrating an exterior of an electronic apparatus according to yet other embodiments of the disclosure.

As illustrated in FIG. 5, the support 108b may be connected with the main body 105 at a predetermined point (e.g., ⅔-¾ point of a height of the main body) of the main body 105. In case that the support 108 is rotated toward the main body, the support 108b may support the main body 105 for the main body 105 to be oriented at any angle while the main body 105 is laid sideways.

FIG. 5 is a perspective view illustrating the exterior of the electronic apparatus 100 in an embodiment of the disclosure.

Referring to FIG. 5, the electronic apparatus 100 may include a support (or a "handle") 108c. The support 108c in various examples may include a base plate 108c-1 supporting the electronic apparatus 100 on the ground and two support members 108c-2 connecting the base plate 108c-1 with the main body 105.

In an example of the disclosure, the two support members 108c-2 may have the same height, and one cross section of each of the two support members 108c-2 may be coupled to or separated from each other by a groove and a hinge member 108c-3 provided on one outer peripheral surface of the main body 105.

The two support members may be hinge-coupled to the main body 105 at a predetermined point (e.g., ⅓ to ¾ point of the height of the main body) of the main body 105.

In case that the two support members and the main body are coupled with each other by the hinge member 108c-3, the main body 105 may be rotated based on a virtual horizontal axis formed by the two hinge members 108c-3, thus adjusting the projection angle of the projection lens 110.

Figure 6A:
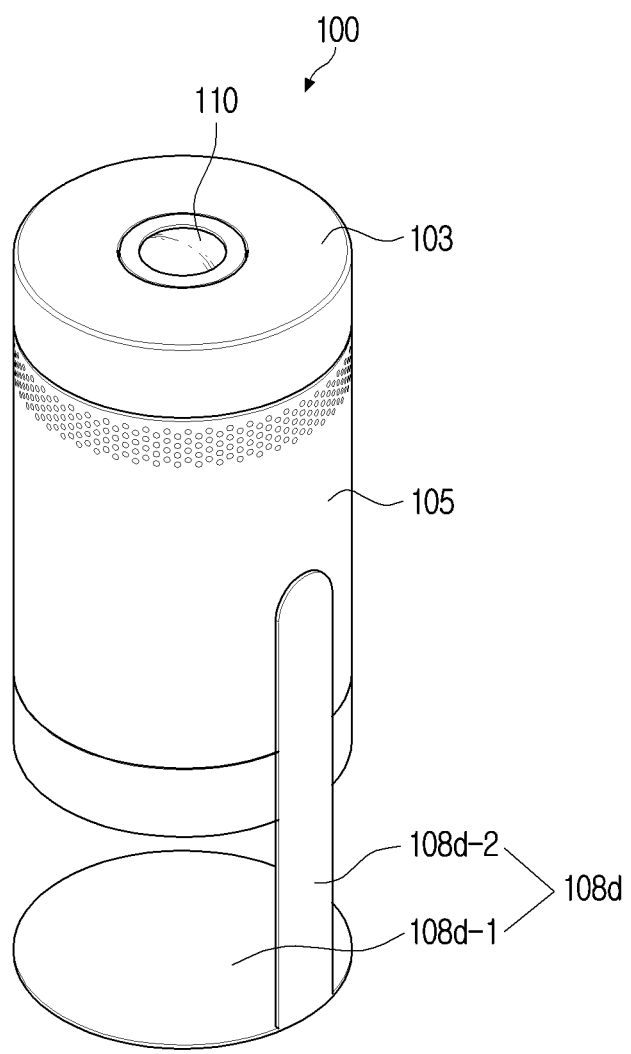
FIG. 6A is a perspective view illustrating an exterior of an electronic apparatus according to yet other embodiments of the disclosure.
Figure 6B:
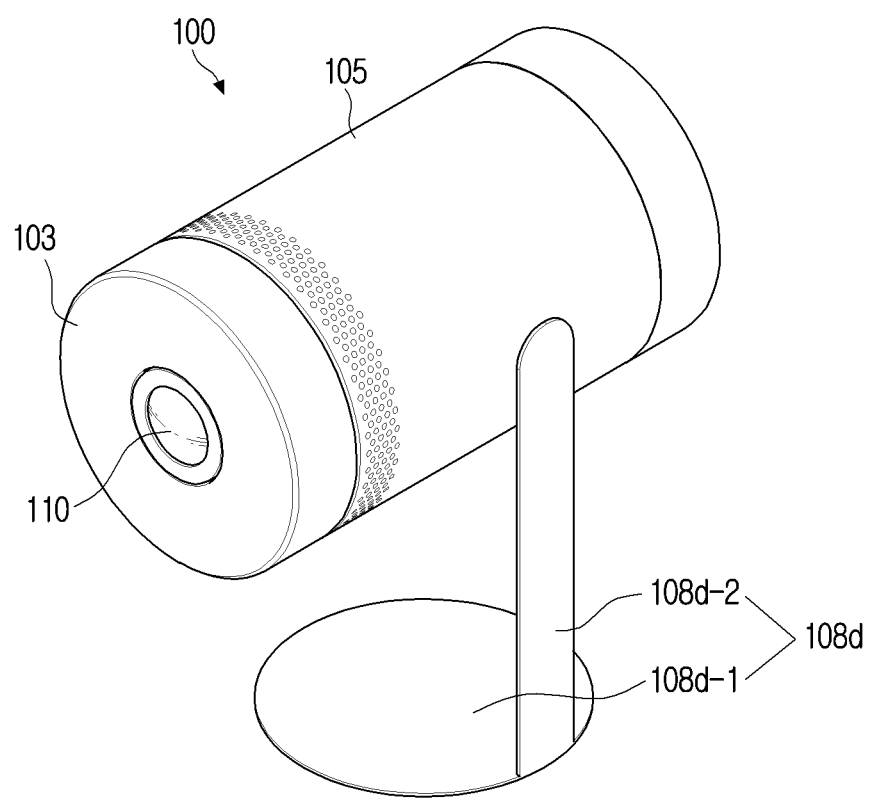
FIG. 6B is a perspective view illustrating a rotated state of the electronic apparatus of FIG. 6A.

FIG. 5 illustrates an embodiment in which the two support members 108c-2 are connected with the main body 105, the disclosure is not limited thereto, and as in FIGS. 6A and 6B, one support member and the main body 105 may be connected with each other by one hinge member.

FIG. 6A is a perspective view illustrating the exterior of the electronic apparatus 100 in still yet an example of the disclosure.

FIG. 6B is a perspective view illustrating a state where the electronic apparatus 100 of FIG. 6A is rotated.

Referring to FIGS. 6A and 6B, a support 108d in various examples of the disclosure may include a base plate 108d-1 supporting the electronic apparatus 100 on the ground and one support member 108d-2 connecting a base plate 108d-1 with the main body 105.

In addition, a cross section of the one support member 108d-2 may be coupled to or separated from the main body by a groove and a hinge member (not shown) provided on one outer peripheral surface of the main body 105.

In case that the one support member 108d-2 and the main body 105 are coupled with each other by one hinge member (not shown), the main body 105 may be rotated based on a virtual horizontal axis formed by the one hinge member (not shown), as in FIG. 6B.

The support illustrated in FIGS. 3, 4, 5, 6A and 6B is only an example, and the electronic apparatus 100 may include the support in various positions or shapes.

Figure 7A:
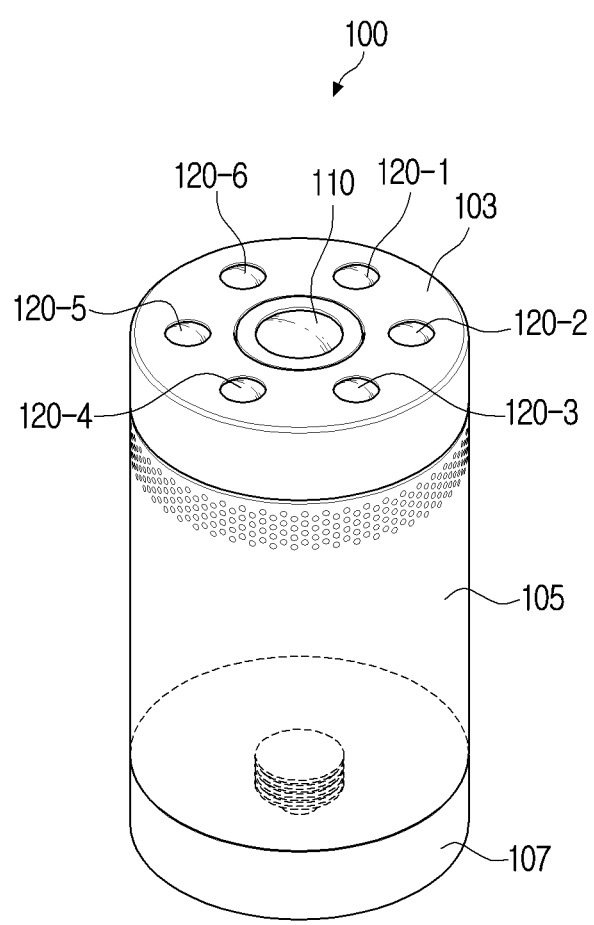
FIG. 7A is a diagram illustrating a lighting part including a plurality of light sources, according to an embodiment of the disclosure.
Figure 7B:
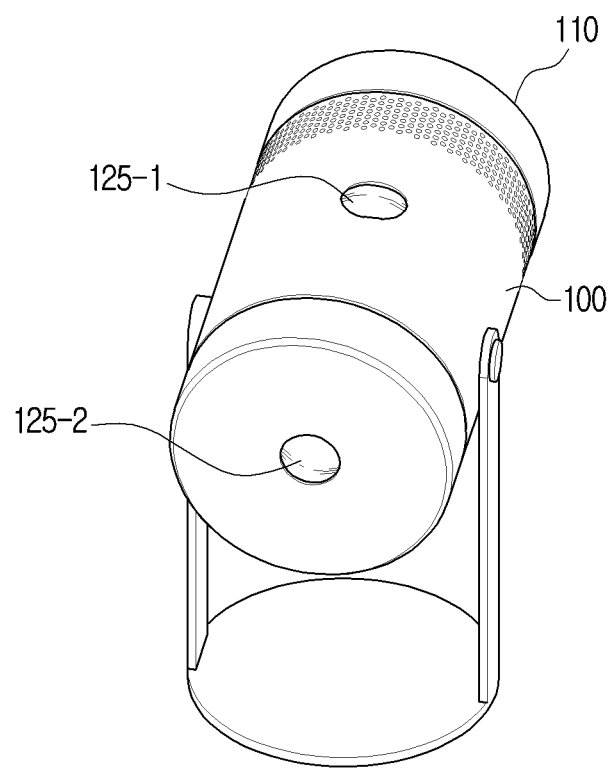
FIG. 7B is a diagram illustrating a lighting part including a plurality of light sources, according to an embodiment of the disclosure.

FIG. 7A is a diagram illustrating a lighting part including a plurality of light sources, according to an embodiment of the disclosure. FIG. 7B is a diagram illustrating a lighting part including a plurality of light sources, according to an embodiment of the disclosure.

The light source of the lighting part 114 according to the disclosure may be disposed at various locations of the electronic apparatus 100 as illustrated in FIGS. 7A and 7B.

Referring to FIG. 7A, a plurality of light sources of the lighting part 114 may be located in a head 103 where the projection lens 110 is located. The plurality of light sources 120-1 to 120-6 emit light in the same direction as the projection direction of the image projected from the projection lens 110, thereby preventing glare of the user.

Referring to FIG. 7A, it is described that a number of a plurality of light sources 120-1 to 120-6 is six, but the disclosure is not limited thereto and may be implemented with various numbers.

Referring to FIG. 7B, the light source 125-1 of the lighting part 114 may be disposed in a region of the main body 105 of the electronic apparatus 100. Further, another light source 125-2 of the lighting part 114 may be disposed below the electronic apparatus 100 to emit light in a direction opposite to the projection direction of the image projected from the projection lens 110. In addition, the light sources 125-1, 125-2 of the lighting part 114 may be illuminated while the image is projected from the projection lens 110, so that the illuminance in the indoor space is increased, thereby preventing glare of the user.

Figure 7C:
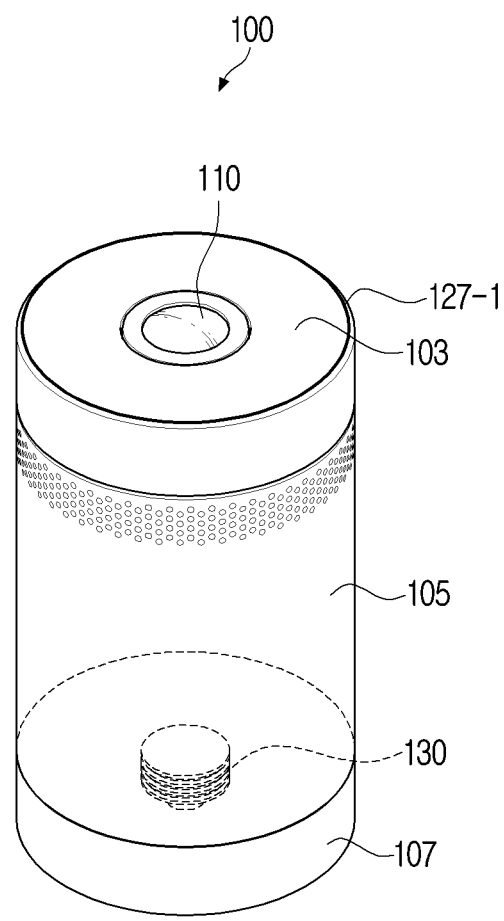
FIG. 7C is a diagram illustrating a lighting part of line light emission according to an embodiment of the disclosure.
Figure 7D:
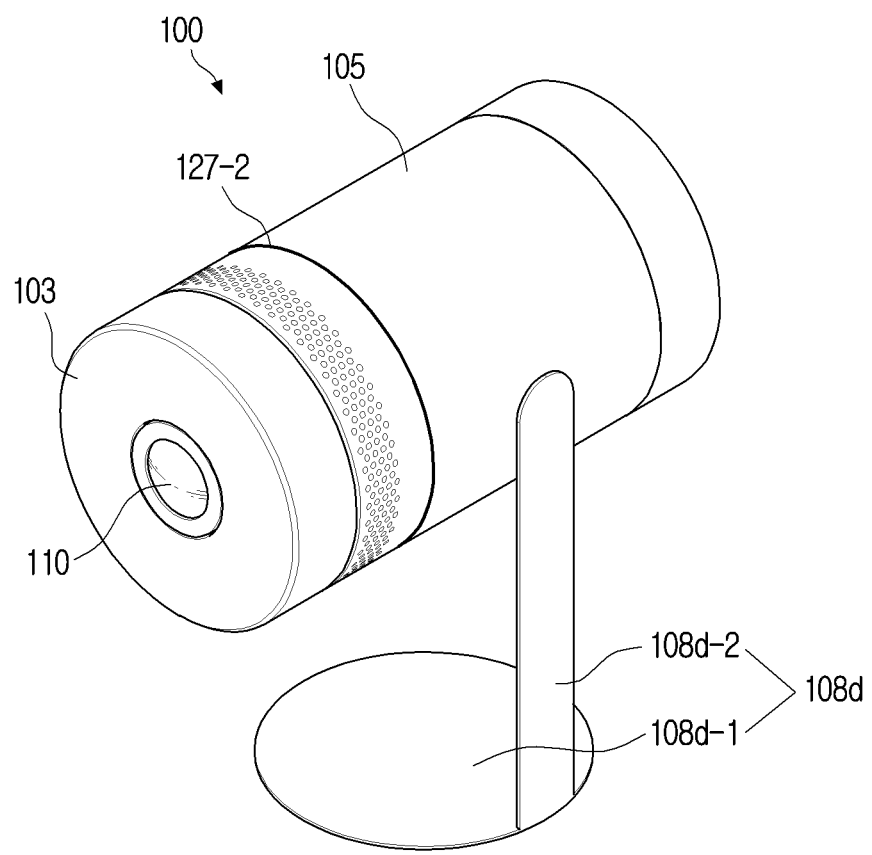
FIG. 7D is a diagram illustrating a lighting part of line light emission according to an embodiment of the disclosure.

FIG. 7C is a diagram illustrating a lighting part of line light emission according to an embodiment of the disclosure. FIG. 7D is a diagram illustrating a lighting part of line light emission according to an embodiment of the disclosure.

The light source of the lighting part 114 may be implemented with a plurality of LED light sources like FIGS. 7A and 7B, but the disclosure is not limited thereto.

As an embodiment of the disclosure, the light source 127-1 of FIG. 7C and the light source 127-2 of FIG. 7D may emit light by line light emission through a diffusing plate or a diffusing member.

In one embodiment of the disclosure, as shown in FIG. 7C, the light source 127-1 of the lighting part 114 may be located in a head 103 in which the projection lens 110 is located. The light source 127-1 of FIG. 7C emits light in the same direction as the projection direction of the image projected from the projection lens 110, thereby preventing glare of the user. Although FIG. 7C illustrates that the light source 127-1 is located at a boundary portion of the head 103, the disclosure is not limited thereto, and a light source 127-1 may be located in one region of the regions of the head 103.

In one embodiment of the disclosure, as shown in FIG. 7D, the light source 127-2 of the lighting part 114 may be disposed in one region of the main body 105 of the electronic apparatus 100. The light source 127-2 of FIG. 7D is emitted while the image is projected from the projection lens 110, thereby increasing the illuminance in the indoor space to prevent glare of the user. Although FIG. 7D illustrates that the light source 127-2 is located at the upper portion of the main body 105, the disclosure is not limited thereto, and the light source 127-2 may be located in one region of the regions of the main body 105.

In an embodiment, the light source 127-1 of FIG. 7C and the light source 127-2 of FIG. 7D may be divided into regions by the control of the lighting part 114 to emit light. In addition, as an embodiment, the light source 127-1 of FIG. 7C and the light source 127-2 of FIG. 7D may change at least one of color or brightness under the control of a user. That is, the color and brightness of the light source 127-1 of FIG. 7C and the light source 127-2 of FIG. 7D may be controlled through the UI of the portable terminal device of the user.

In addition, though not illustrated in drawings, a line light emission lighting as FIG. 7C of the disclosure may be disposed at a lower portion of the electronic apparatus 100.

Figure 7E:
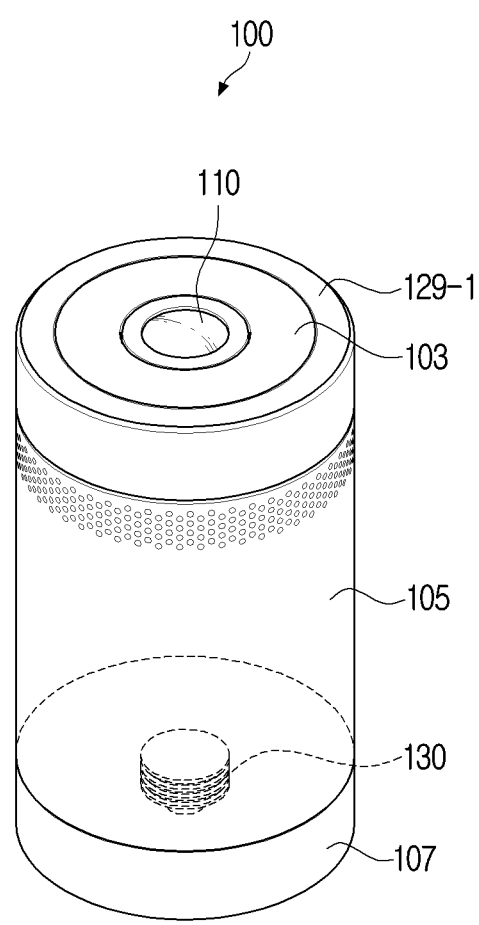
FIG. 7E is a diagram illustrating a lighting part of surface light emission according to an embodiment of the disclosure.
Figure 7F:
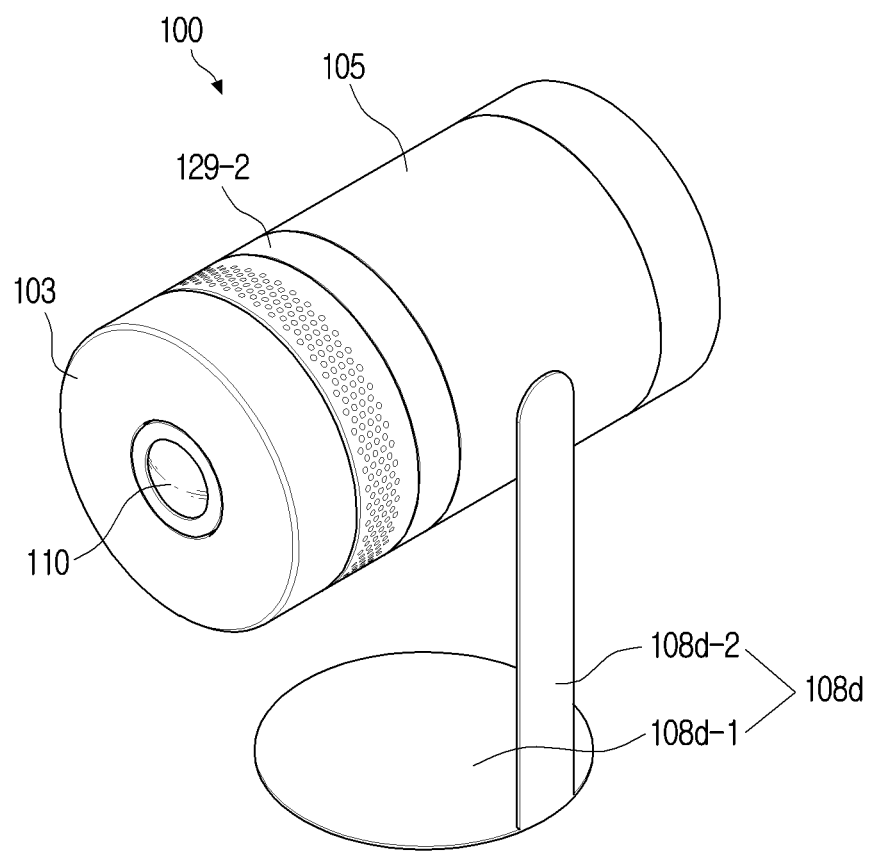
FIG. 7F is a view illustrating a lighting part of surface light emission according to an embodiment of the disclosure.

FIG. 7E is a diagram illustrating a lighting part of surface light emission according to an embodiment of the disclosure. FIG. 7F is a view illustrating a lighting part of surface light emission according to an embodiment of the disclosure.

As an embodiment of the disclosure, the light source 129-1 of FIG. 7E and the light source 129-2 of FIG. 7F may emit light by surface light emission through a diffusing plate or a diffusing member.

In one embodiment of the disclosure, as shown in FIG. 7E, a light source 129-1 of the lighting part 114 may be located in the head 103 in which the projection lens 110 is located. The light source 129-1 of FIG. 7E emits light in the same direction as the projection direction of the image projected from the projection lens 110, thereby preventing glare of the user. Although FIG. 7E illustrates that the light source 129-1 is located at a boundary portion of the head 103, the disclosure is not limited thereto, and the light source 129-1 may be located in one region among the regions of the head 103.

According to an embodiment of the disclosure, as shown in FIG. 7F, the light source 129-2 of the lighting part 114 may be disposed in one region of the main body 105 of the electronic apparatus 100. The light source 129-2 of FIG. 7F is emitted while the image is projected from the projection lens 110, so that the illuminance in the indoor space is increased, thereby preventing glare of the user. Although FIG. 7F illustrates that the light source 129-2 is located at the upper portion of the main body 105, the disclosure is not limited thereto, and the light source 129-2 may be located in one region among the regions of the main body 105.

In the embodiment of the disclosure, the light source 129-1 of FIG. 7E and the light source 129-2 of FIG. 7F may be divided by regions to emit light by the control of the lighting part 114. In addition, as an embodiment, at least one of the color and brightness of the light source 129-1 of FIG. 7E and the light source 129-2 of FIG. 7F may be changed under the control of a user. That is, the color and brightness of the light source 129-1 of FIG. 7E and the light source 129-2 of FIG. 7F may be controlled through the UI of the portable terminal device of the user.

In addition, though not illustrated as the drawings, a surface light emission lighting like FIG. 7E may be located at a lower portion of the electronic apparatus 100.

Figure 8:
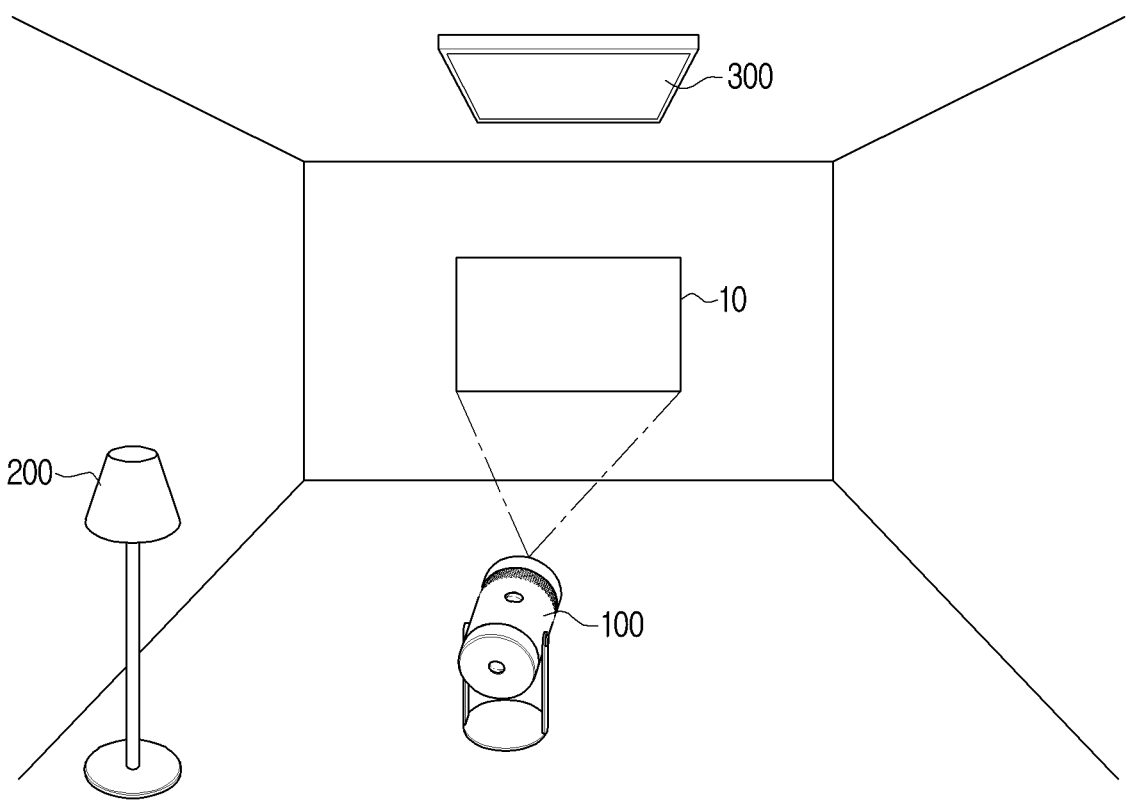
FIG. 8 is a diagram illustrating an embodiment of controlling a light source of a lighting part based on illuminance information in the indoor space by an external light source and illuminance information by a projection image, according to an embodiment of the disclosure.

FIG. 8 is a diagram illustrating an embodiment of controlling a light source of a lighting part based on information on illuminance in the indoor space by an external light source and information on illuminance by a projection image 10, according to an embodiment of the disclosure FIG. 8 is a view illustrating an embodiment in which the electronic apparatus 100 projects the projection image 10 toward one wall surface in the indoor space in which a first external lighting device 200 and a second external lighting device 300 are installed.

The electronic apparatus 100 may obtain information on first illuminance corresponding to the first external lighting device 200 and the second external lighting device 300 through an illuminance sensor. That is, the electronic apparatus 100 may obtain the information on the first illuminance indicating the degree of brightness in the indoor space by the light source of the first external lighting device 200 and the light source of the second external lighting device 300.

In addition, the electronic apparatus 100 may obtain the information on the second illuminance corresponding to the projection image 10 projected by the electronic apparatus 100 through the illuminance sensor. Here, the illuminance sensor may be included in the electronic apparatus 100 but the disclosure is not limited thereto and may be an external illuminance sensor installed in the indoor space.

In one embodiment, based on the information on first illuminance and the information on second illuminance being obtained, the electronic apparatus 100 may control the light source of the lighting part 114 in the electronic apparatus 100 based on the information on the first illuminance and the information on the second illuminance in order to prevent glare of the user. That is, based on the brightness in the indoor space being dark, but the projection image 10 being identified to be brighter than the threshold brightness based on the first illuminance and the second illuminance, the electronic apparatus 100 may increase the illuminance in the indoor space by controlling the brightness of the light source of the lighting part in the electronic apparatus 100.

In one embodiment, based on the information on first illuminance and the information on the second illuminance being obtained, the electronic apparatus 100 may control at least one of the light source of the first external lighting device 200 and the light source of the second external lighting device 300 based on the information on the first illuminance and the information on the second illuminance in order to prevent glare of the user. That is, based on the first external lighting device 200 and the second external lighting device 300 being implemented as a smart lighting device capable of communicating with the electronic apparatus 100, the electronic apparatus 100 may transmit a control command for controlling the brightness of the first external lighting device 200 and the second external lighting device 300 to at least one of the first external lighting device 200 and the second external lighting device 300 to increase the illuminance in the indoor space.

In addition, as an embodiment, if the first external lighting device 200 and the second external lighting device 300 are implemented with a smart lighting device communicable with the electronic apparatus 100, the electronic apparatus 100 may receive brightness information from the first external lighting device 200 and the second external lighting device 300 and may obtain the information on first illuminance.

Figure 9:
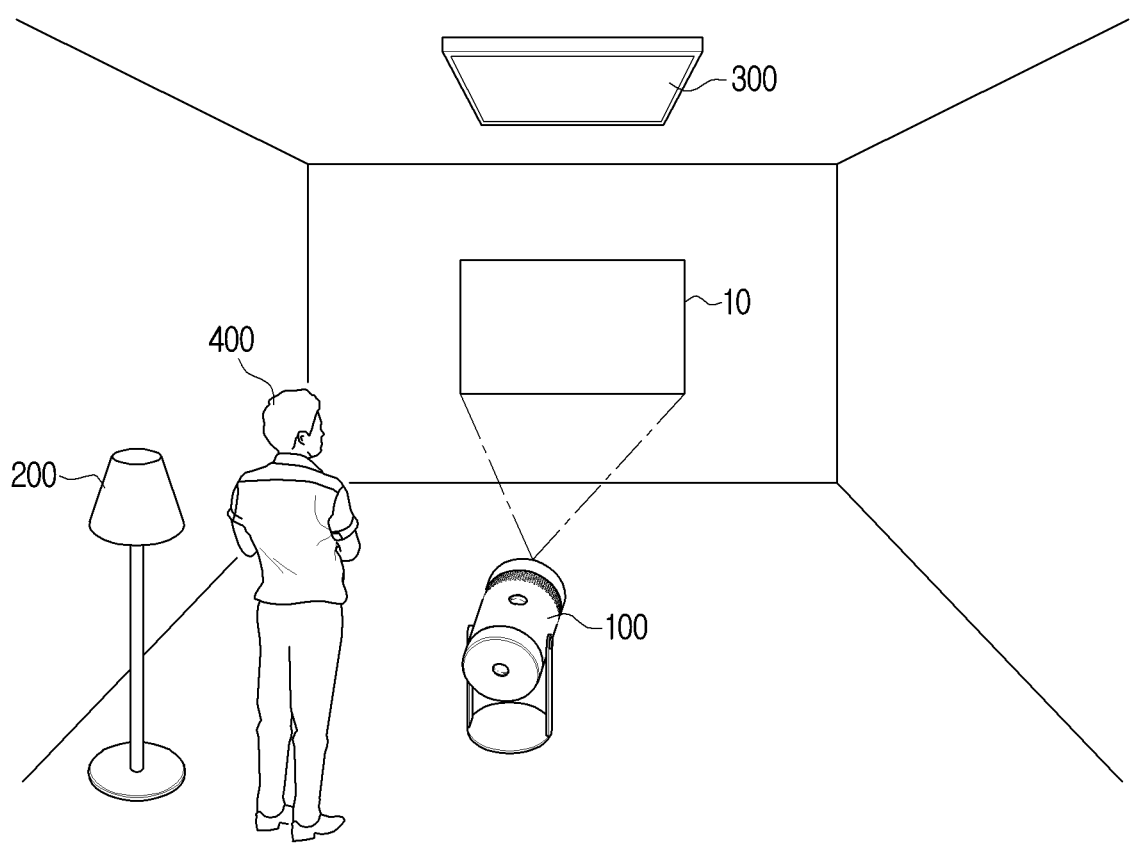
FIG. 9 is a diagram illustrating an embodiment of controlling a light source of a lighting part by further considering the location of a user according to an embodiment of the disclosure.

FIG. 9 is a diagram illustrating an embodiment of controlling a light source of a lighting part by further considering the location of a user according to an embodiment of the disclosure.

The electronic apparatus 100 may obtain information on first illuminance corresponding to the first external lighting device 200 and the second external lighting device 300 through an illuminance sensor. That is, the electronic apparatus 100 may obtain information on first illuminance indicating the degree of brightness in the indoor space by the light source of the first external lighting device 200 and the light source of the second external lighting device 300.

In addition, the electronic apparatus 100 may obtain the information on second illuminance corresponding to the projection image 10 projected by the electronic apparatus 100 through the illuminance sensor. Here, the illuminance sensor may be included in the electronic apparatus 100 but the disclosure is not limited thereto and may be an external illuminance sensor installed in the indoor space.

The electronic apparatus 100 may obtain information on first location for the projection image 10 projected by the electronic apparatus 100 and information on second location for the user 400 through the distance sensor. The information on the first location may include information on space for the projection region and information on distance between the projection region and the electronic apparatus 100. The information on the second location information may include information on space for the user 400, information on distance between the user 400 and the electronic apparatus 100, and information on movement for the user 400. Here, the distance sensor may be included in the electronic apparatus 100, but the disclosure is not limited thereto and may be an external distance sensor installed in the indoor space.

In addition, the electronic apparatus 100 may obtain information on between the projection image 10 and the user 400 based on the information on the first location and the information on the second location. Based on the obtained information on distance, the electronic apparatus 100 may control a light source of the lighting part 114 in the electronic apparatus 100 based on information on the distance between the projection region 10 and the user 400, the information on the first illuminance, and the information on the second illuminance.

As an embodiment, the information on the fourth illuminance of the projection image 10 at the location of a user 400 may be obtained based on the information on the distance between the projection image 10 and the user 400 and the information on the second illuminance. That is, the information on the fourth illuminance may indicate brightness level that affects a location of the user 400 by the projection image 10.

In one embodiment, based on the information on fourth illuminance being obtained, the electronic apparatus 100 may control the light source of the lighting part in the electronic apparatus 100 based on the information on first illuminance and the information on fourth illuminance in order to prevent glare of the user. That is, based on the brightness in the indoor space being dark but the brightness of the projection image 10 being identified to be brighter than the threshold brightness based on the information on first illuminance and the information on fourth illuminance, the electronic apparatus 100 may increase the illuminance in the indoor space by controlling the brightness of the light source of the lighting part 114 in the electronic apparatus 100.

In one embodiment, based on the information on fourth illuminance being obtained, the electronic apparatus 100 may control at least one of the light source of the first external lighting device 200 and the light source of the second external lighting device 300 based on the information on the first illuminance and the information on the fourth illuminance in order to prevent glare of the user. That is, based on the first external lighting device 200 and the second external lighting device 300 being implemented as a smart lighting device capable of communicating with the electronic apparatus 100, the electronic apparatus 100 may control the first external lighting device 200 and the second external lighting device 300 to increase the illuminance in the indoor space.

In one embodiment, the brightness of the light source of the lighting part in the electronic apparatus 100 may be differently controlled according to whether the location of the user 400 is located between the projection image 10 and the electronic apparatus 100 or behind the direction in which the electronic apparatus 100 projects the projection image 10. That is, the glare level may be different according to the location of the user 400, and the brightness of the light source of the lighting part 114 in the electronic apparatus 100 may be controlled based on the relative locations of the user 400, the projection region 10, and the electronic apparatus 100.

Figure 10:
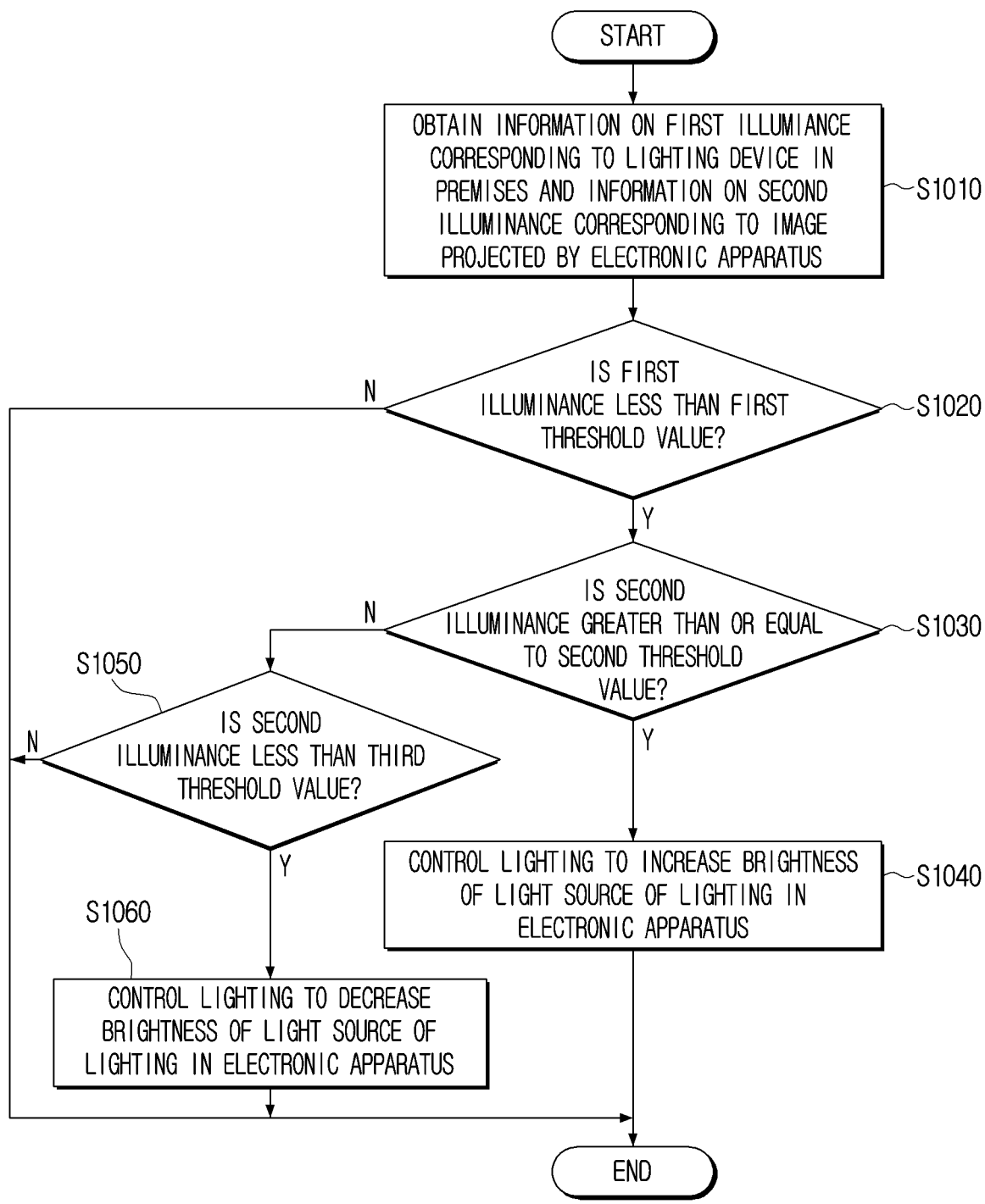
FIG. 10 is a flowchart illustrating a specific operation of an electronic apparatus according to an embodiment of the disclosure.

FIG. 10 is a flowchart illustrating a specific operation of an electronic apparatus according to an embodiment of the disclosure.

Referring to FIG. 10, the electronic apparatus 100 may obtain information on first illuminance corresponding to a lighting device in the indoor space and information on second illuminance corresponding to an image projected by the electronic apparatus 100 in operation S1010. The information on the first illuminance is information on brightness sensed by a light source emitted by lighting in the indoor space where the electronic apparatus 100 is located and may be expressed, for example, in a lux unit. The information on the second illuminance is information on brightness detected by an illuminance sensor by reflecting an image projected from the electronic apparatus 100 to a projection area and may be expressed in a lux unit as an example.

The electronic apparatus 100 may identify whether the first illuminance is less than the first threshold value in operation S1020. The first threshold value is a maximum illuminance value that the brightness in the indoor space is identified to be dark and may be preset by a user or manufacturer.

Based on the information on first illuminance being not less than the first threshold value in operation S1020-N, the electronic apparatus 100 may maintain the brightness of the light source of the lighting part in the electronic apparatus 100 as it is.

Based on the first illuminance being less than a first threshold value in operation S1020-Y, the electronic apparatus 100 may identify whether the second illuminance is greater than or equal to a second threshold value in operation S1030. The second threshold value is a minimum illuminance value that the projection is identified to be bright to cause glare in the projection image and may be preset by a user or manufacturer. According to an embodiment of the disclosure, the second threshold value is a value that may be changed by a value of the first illuminance, and for example, the first threshold value and the second threshold value may be a threshold value where a ratio of (secondilluminance: firstilluminance) is (10:1).

Based on the second illuminance being greater than or equal to a first threshold value in operation S1030-Y, the electronic apparatus 100 may control the lighting part to increase brightness of the light source of the lighting part in the electronic apparatus 100 in operation S1040. In addition, based on the second illuminance being greater than or equal to a second threshold value in operation S1030-Y, the electronic apparatus 100 may control to increase brightness of the light source of the lighting part 114 in the electronic apparatus 100 and decrease brightness of the image projected by the electronic apparatus 100.

In an embodiment, the electronic apparatus 100 may control the lighting part 114 to increase the brightness of the light source of the lighting part so that the ratio of (second illuminance:firstilluminance) is (10:1). That is, the information on first illuminance described in FIG. 10 may include information on brightness emitted from the external lighting device in the indoor space and brightness information emitted by a light source of the lighting part in the electronic apparatus 100.

Based on the second illuminance being not greater than or equal to the second threshold value in operation S1030-Y, the electronic apparatus 100 may identify whether the second illuminance is less than a third threshold value in operation S1050. A third threshold value is a maximum illuminance value to the extent of making a user feel inconvenient as the projection image is too dark, and may be preset by the user or manufacturer.

Based on the second illuminance being less than a third threshold value in operation S1050-Y, the electronic apparatus 100 may control the lighting part 114 to lower the brightness of the light source of the lighting part 114 in the electronic apparatus 100 in operation S1060.

In addition, based on the second illuminance being not less than the third threshold value in operation S1050-N, the electronic apparatus 100 may maintain the brightness of the lighting part 114 inside the electronic apparatus 100 as it is.

Figure 11:
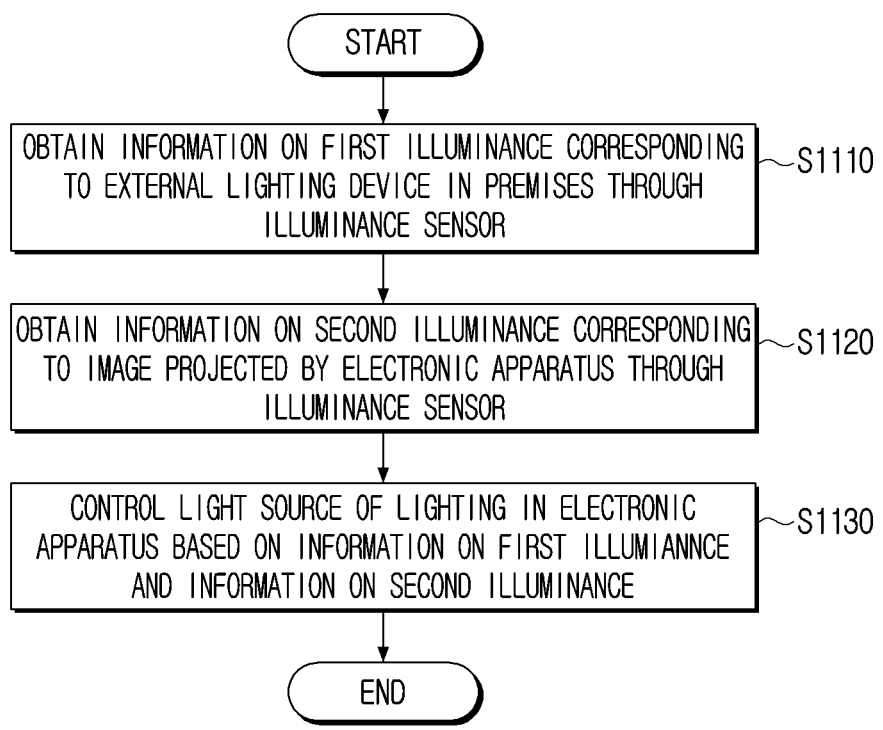
FIG. 11 is a flowchart illustrating an operation of an electronic apparatus according to an embodiment of the disclosure.

FIG. 11 is a flowchart illustrating an operation of an electronic apparatus according to an embodiment of the disclosure.

Referring to FIG. 11, the electronic apparatus 100 may obtain information on first illuminance corresponding to the external lighting device in the indoor space through the illuminance sensor in operation S1110.

The electronic apparatus 100 may obtain information on second illuminance corresponding to the image projected by the electronic apparatus through the illuminance sensor in operation S1120. The illuminance sensor is configured to obtain information on brightness in the indoor space, and may be included in the electronic apparatus 100, but is not limited thereto, and the electronic apparatus 100 may obtain information on illuminance through an external illuminance sensor in the indoor space. For example, the electronic apparatus 100 may obtain, as information on first illuminance, information on illuminance obtained through an illuminance sensor before a projection image is projected. In addition, while the image is being projected in the electronic apparatus 100, a difference between the illuminance obtained through the illuminance sensor and the first illuminance may be obtained as the second illuminance. However, the disclosure is not limited thereto, and information on second illuminance may be obtained by various methods.

In addition, the electronic apparatus 100 may control a light source in the lighting part 114 in the electronic apparatus 100 based on the information on the first illuminance and the information on the second illuminance in operation S1130.

To be specific, the electronic apparatus 100 may obtain information on third illuminance corresponding to the light source of the lighting part 114 while the light source of the lighting part in the electronic apparatus emits light. The information on third illuminance is illuminance information sensed by a light source of the lighting part 114, for example, may be expressed in a lux unit. In this case, the information on the first illuminance may be information on illuminance corresponding to an external lighting device except for the light source of the lighting part 114. The information on the third illuminance may be obtained by an illuminance sensor, but is not limited thereto. As an example, since the brightness of the lighting part 114 is controlled by the control of the electronic apparatus 100, the electronic apparatus 100 may obtain information on third illuminance through the brightness of the light source of the lighting part 114 without sensing illuminance.

In addition, the electronic apparatus 100 may control the light source of the lighting part 114 such that a sum of a value of the first illuminance and a value of the third illuminance is greater than or equal to a predetermined ratio (e.g., 1/10 or 2/10) of a value of the second illuminance.

In an embodiment, the electronic apparatus 100 may further include an input/output interface 117 for communicating with an external device. Based on the information on the first illuminance and the information on the second illuminance of the electronic apparatus 100, an input/output interface 117 may be controlled to transmit a control command for controlling the brightness of the external lighting device capable of communicating with the electronic apparatus 100 to the external lighting device.

It will be understood, however, that it is not intended to limit the techniques described herein to specific examples, but may include various modifications, equivalents, and/or alternatives of the examples of the techniques described herein. In the context of the description of the drawings, identical, similar reference numerals may be used for like and similar elements.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a numerical value, a function, an operation), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

The terms such as "first," "second," and so on may be used to describe a variety of elements, but the elements may not be limited by these terms. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element).

On the other hand, when an element (e.g., a first element) is "directly connected" or "directly accessed" to another element (e.g., a second element), it may be understood that there is no other element (e.g., a third element) between the other elements.

The expression "configured to" may be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Various elements and regions in the drawings may be schematically drawn. Accordingly, the technical concept(s) is not limited by a relative size or spacing drawn in the accompanying drawings.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor itself. According to a software implementation, embodiments such as the procedures and functions described herein may be implemented with separate software modules. Each of the above-described software modules may perform one or more of the functions and operations described herein.

A method according to various embodiments described above may be stored in a non-transitory readable medium. Such a non-transitory computer-readable medium may be loaded and used in a variety of devices.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

While the various example embodiments have been illustrated and described with reference to certain embodiments, the disclosure is not limited to specific embodiments, and it will be understood by those of ordinary skill in the art that various changes in form and details may be made therein without departing from the spirit and scope as defined, for example, by the following claims and their equivalents.

What is claimed is:

1. An electronic apparatus comprising:
   a projecting part to project an image;
   an illuminance sensor;
   a lighting part comprising a light source;
   a memory to store at least one instruction; and
   a processor configured to control the electronic apparatus by executing the at least one instruction stored in the memory,
   wherein the processor is further configured to:
      control the illuminance sensor to obtain information on first illuminance to be detected by the illuminance sensor and corresponding to an external lighting device;
      control the illuminance sensor to obtain information on second illuminance in which an image projected by the projecting part is reflected to a projection region and to be detected by the illuminance sensor;
      control the lighting part to change brightness of the image projected by the projecting part and to change brightness of the light source based on the information on the first illuminance and the information on the second illuminance.

2. The electronic apparatus of claim 1, further comprising:
   a distance sensor,
   wherein the processor is configured to:
      control the distance sensor to obtain information on a first location for a projection region corresponding to the image projected by the projection part,
      control the distance sensor to obtain information on a second location for a user, and
      control the light source of the lighting part based on:
         information on a distance between the projection region and the user obtained based on the information on the first location and the information on the second location information;
         the information on the first illuminance; and
         the information on the second illuminance.

3. The electronic apparatus of claim 1, wherein the processor is further configured to:
   control the illuminance sensor to obtain information on third illuminance to be detected by the illumination sensor and corresponding to the light source of the lighting part while the light source of the lighting part emits light, and
   control the light source of the lighting part based on the information on first illuminance, the information on the second illuminance, and the information on the third illuminance.

4. The electronic apparatus of claim 3, wherein the processor is further configured to control the light source of the lighting part such that a sum of a value of the first illuminance and a value of the third illuminance to a value of second illuminance is greater than or equal to 1/10 ratio.

5. The electronic apparatus of claim 1, wherein the processor is further configured to:
   based on the first illuminance being less than a first threshold value and the second illuminance being greater than or equal to a second threshold value, control the lighting part to decrease brightness of the image projected by the projecting part and increase brightness of the light source of the lighting part.

6. The electronic apparatus of claim 1, wherein the processor is further configured to, based on the information on first illuminance being less than a first threshold value and the information on second illuminance being less than a third threshold value, control the lighting part to decrease brightness of the light source of the lighting part.

7. The electronic apparatus of claim 1, wherein the processor is further configured to obtain information on an image projected by the projection part, and control the light source of the lighting part or correct the image projected by the projection part by further using the obtained information on the image.

8. The electronic apparatus of claim 7, wherein the processor is further configured to, based on identifying that the image is a High Dynamic Range (HDR) image based on the information on the image, control the lighting part to increase brightness of the light source of the lighting part.

9. The electronic apparatus of claim 7, wherein the processor is further configured to, based on identifying, based on the information on the image, that brightness of a background screen of the image is less than preset brightness and a movement of an object included in the image, control the lighting part to increase brightness of the light source of the lighting part.

10. The electronic apparatus of claim 1, further comprising:
an input/output interface configured to communicate with the external lighting device,
wherein the processor is further configured to, based on the information on the first illuminance and the information on the second illuminance, control the input/output interface to transmit brightness of the external lighting device communicable with the electronic apparatus to the external lighting device.

11. A control method of an electronic apparatus, the method comprising:
obtaining, by an illuminance sensor, information on first illuminance to be detected by the illuminance sensor and corresponding to an external lighting device;
obtaining, by the illuminance sensor, information on second illuminance in which an image projected by a projecting part of the electronic apparatus is reflected to a projection region and to be detected by the illuminance sensor; and
controlling, by a processor, a lighting part including a light source in the electronic apparatus to change brightness of the image projected by the projecting part and to change brightness of the light source based on the information on the first illuminance and the information on the second illuminance.

12. The method of claim 11, comprising:
obtaining information by a distance sensor, on a first location for a projection region corresponding to the image projected by the electronic apparatus;
obtaining information by the distance sensor, on a second location for a user; and
controlling, by the processor, the light source of the lighting part based on:
information on a distance between the projection region and the user obtained through the information on the first location and the information on the second location;
the information on the first illuminance; and
the information on the second illuminance.

13. The method of claim 11, further comprising:
obtaining, by the illuminance sensor, information on third illuminance corresponding to the light source of the lighting part while the light source of the lighting part emits light; and
controlling, by the processor, the light source of the lighting part based on the information on the first illuminance, the information on the second illuminance, and the information on the third illuminance.

14. The method of claim 13, wherein the controlling of the light source of the lighting part comprises controlling the light source of the lighting part such that a sum of a value of the first illuminance and a value of the third illuminance to a value of the second illuminance is greater than or equal to 1/10 ratio.

15. The method of claim 11, wherein the controlling of the light source of the lighting part in the electronic apparatus comprises, based on the first illuminance being less than a first threshold value and the second illuminance being greater than or equal to a second threshold value, controlling the lighting part to decrease brightness of the image projected by the electronic apparatus and increase brightness of the light source of the lighting part.

* * * * *